United States Patent
Nam et al.

(10) Patent No.: US 12,548,632 B2
(45) Date of Patent: Feb. 10, 2026

(54) NONVOLATILE MEMORY DEVICE INCLUDING WORDLINE LEAKAGE CURRENT DETECTOR, STORAGE DEVICE INCLUDING THE SAME, AND METHOD OF OPERATING THE SAME

(71) Applicant: SAMSUNG ELECTRONICS CO., LTD., Suwon-si (KR)

(72) Inventors: Buil Nam, Suwon-si (KR); Jinsun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 18/639,033

(22) Filed: Apr. 18, 2024

(65) Prior Publication Data
US 2025/0124995 A1   Apr. 17, 2025

(30) Foreign Application Priority Data

Oct. 16, 2023  (KR) .................. 10-2023-0137404

(51) Int. Cl.
G11C 29/12 (2006.01)
G11C 29/40 (2006.01)

(52) U.S. Cl.
CPC ........ *G11C 29/12005* (2013.01); *G11C 29/40* (2013.01); *G11C 2029/4002* (2013.01)

(58) Field of Classification Search
CPC .............. G11C 29/12005; G11C 29/40; G11C 2029/4002
See application file for complete search history.

(56) References Cited

U.S. PATENT DOCUMENTS

| | | |
|---|---|---|
| 6,839,293 B2 | 1/2005 | Kawamoto et al. |
| 7,679,133 B2 | 3/2010 | Son et al. |
| 8,102,698 B2 * | 1/2012 | Scheuerlein ............ G11C 11/21 365/163 |
| 8,553,466 B2 | 10/2013 | Han et al. |
| 8,559,235 B2 | 10/2013 | Yoon et al. |
| 8,654,587 B2 | 2/2014 | Yoon et al. |
| 9,536,970 B2 | 1/2017 | Seol et al. |
| 9,903,901 B2 | 2/2018 | Jeon et al. |
| 10,714,205 B1 | 7/2020 | Fang et al. |
| 11,257,559 B1 | 2/2022 | Choi |
| 2014/0241049 A1 * | 8/2014 | Vimercati .......... G11C 13/0004 365/210.11 |
| 2015/0294723 A1 | 10/2015 | Choi et al. |
| 2016/0018454 A1 | 1/2016 | Jeon et al. |
| 2023/0025237 A1 | 1/2023 | Lee et al. |

FOREIGN PATENT DOCUMENTS

KR  10-2015-0118650 A   10/2015

* cited by examiner

*Primary Examiner* — Han Yang
(74) *Attorney, Agent, or Firm* — Morgan, Lewis & Bockius LLP

(57) ABSTRACT

A nonvolatile memory device includes a memory cell array including a plurality of memory cells connected to a plurality of wordlines and a plurality of bitlines, a row decoder configured to select one of the plurality of wordlines in response to an address, and a wordline leakage current detector configured to determine whether the selected wordline is defective using trim information related to a level of a reference voltage or a gradient of a detect voltage during a test operation, wherein the trim information is stored internally in an electrical die sorting (EDS) process.

20 Claims, 16 Drawing Sheets

NONVOLATILE MEMORY DEVICE INCLUDING WORDLINE LEAKAGE CURRENT DETECTOR, STORAGE DEVICE INCLUDING THE SAME, AND METHOD OF OPERATING THE SAME

CROSS-REFERENCE TO RELATED APPLICATION

This application claims priority under 35 U.S.C. § 119 to Korean Patent Application No. 10-2023-0137404, filed on Oct. 16, 2023, in the Korean Intellectual Property Office, the disclosure of which is herein incorporated by reference in its entirety.

TECHNICAL FIELD

Example embodiments of the present disclosure relate to a nonvolatile memory device including a wordline leakage current detector, a storage device including the same, and a method of operating the same.

DESCRIPTION OF RELATED ART

Typically, a NAND flash memory may be a storage medium used in various modern electronic devices, effectively storing data through a floating gate and a control gate structure thereof. In particular, a method of representing data bits through injection and removal of electrons in a floating gate may be an enabling technique thereof. A leakage current occurring when voltage is applied to a wordline used to connect memory cells may increase power consumption of NAND flash and may damage an accuracy of data access. Issues caused by the leakage current may have an impact on a lifespan, stability, and/or performance of the electronic devices, a technique of sensing and processing data may improve efficiency and reliability of a NAND flash memory.

SUMMARY

An example embodiment of the present disclosure provides a nonvolatile memory device, which may detect a wordline leakage current, a storage device including the same, and a method of operating the same.

According to an example embodiment of the present disclosure, a nonvolatile memory device includes a first memory cell array including a plurality of memory cells connected to a plurality of wordlines and a plurality of bitlines; a row decoder configured to select a wordline of the plurality of wordlines in response to an address; and a first wordline leakage current detector configured to determine whether the wordline is defective using first trim information of the first memory cell array, wherein the first trim information is stored by the first memory cell array.

According to an example embodiment of the present disclosure, a method of operating a nonvolatile memory device including a core chip having a plurality of memory blocks connected to wordlines and bitlines and a peripheral chip disposed on the core chip and having a wordline leakage current detector includes extracting trim information related to a level of a reference voltage of the wordline leakage current detector or a gradient of a detected voltage of the wordline leakage current detector in an electrical die sorting (EDS) process, wherein the trim information reflects a leakage component of the peripheral cell; and testing leakage of a target wordline among the wordlines in a test operation using the trim information.

According to another example embodiment of the present disclosure, a nonvolatile memory device includes: a memory cell array including a plurality of strings connected to a common source line and one of a plurality of bitlines, where each of the plurality of strings includes at least one string select transistor connected to at least one string selection line, a plurality of memory cells connected to at least one ground selection line, at least one ground select transistor connected to at least one ground selection line, and a plurality of wordlines connected to at least one of the memory cells; a row decoder configured to select a wordline of the plurality of wordlines in response to an address; a page buffer circuit configured to write data to a memory cell corresponding to the wordline or to read data from the memory cell by being connected to the plurality of bitlines during a program operation or a read operation; a voltage generator configured to generate wordline voltages during the program operation or the read operation and to provide the wordline voltages to the plurality of wordlines; an input/output circuit configured to input data from and output data to the page buffer circuit during the program operation and the read operation; a wordline leakage current detector configured to determine leakage of the wordline among the plurality of wordlines using trim information related to a level of a reference voltage or a gradient of detected voltage during a test operation; and a control logic configured to control the wordline leakage current detector, the input/output circuit, the voltage generator, the page buffer circuit, and the row decoder.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
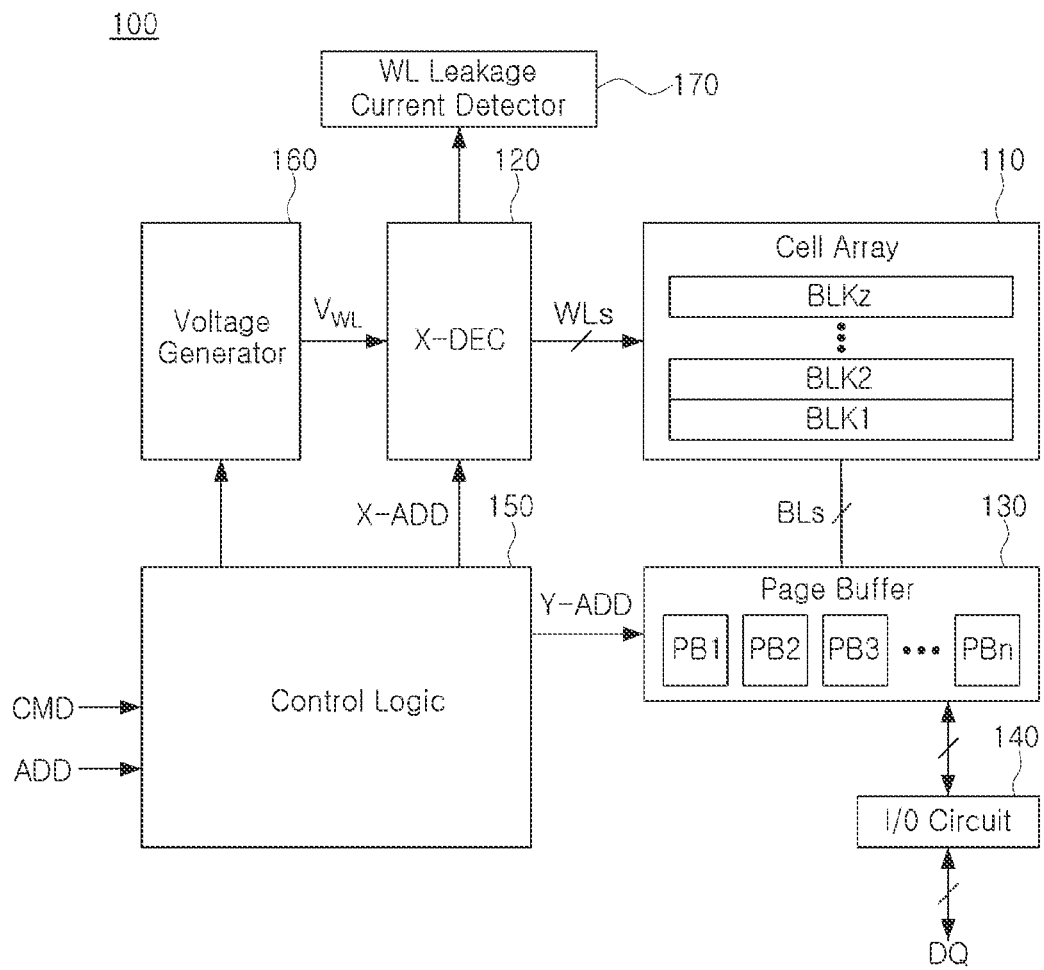
FIG. 1 is a diagram illustrating a diagram illustrating a nonvolatile memory device according to an example embodiment of the present disclosure.

In the following detailed description, reference is made to the accompanying drawings that show, by way of illustration, particular embodiments in which the invention may be practiced. Embodiments are described in sufficient detail to enable those skilled in the art to practice the invention. It is to be understood that various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each embodiment may be modified without departing from the spirit and scope of the invention. The following detailed description is, therefore, not to be taken in a limiting sense, and the scope of the present inventive concept is defined only by the appended claims, appropriately interpreted, along with the full range of equivalents to which the claims are entitled. In the drawings, like numerals refer to the same or similar elements or functionality throughout the several views.

Hereinafter, embodiments of the present disclosure will be described as below with reference to the accompanying drawings.

One or more tests may be carried out in a semiconductor manufacturing process. These processes may include testing to sort for a defective chip. Electrical Die Sorting (EDS) may be carried out when a wafer is completed, package testing may be carried out after the chip is assembled and packaged, and quality testing may be carried out on a device including the chip. In particularly, EDS may include sorting semiconductor chips at the wafer-level (e.g., identified the detective chip), repairing the defective chip, correcting an issue in a fabrication or a design step, or sorting the defective chip to improve efficiency of packaging or testing steps.

A nonvolatile memory device according to an example embodiment, a storage device having the same, and a method of operating the same may extract a leakage component of a peripheral region in advance in an EDS operation, may store the extracted leakage component in the chip and may screen wordline defects with independent levels and gradients. As described with reference to FIG. 4, FIG. 5A, FIG. 5B, FIG. 6, and FIG. 7, the nonvolatile memory device in an example embodiment may lower a reference voltage level, may extract an appropriate reference voltage level of a corresponding chip depending on pass/fail status and may store the level in an E-fuse. As described with reference to FIG. 9A, FIG. 9B, FIG. 10, and FIG. 11, the nonvolatile memory device in an example embodiment may perform sensing (e.g., wordline leakage detection operation) more than once (e.g., twice), may extract a difference in a counter clock number between the sensings, and may store the difference in an E-fuse of the corresponding chip. The nonvolatile memory device in an example embodiment may improve wordline defect sensing capabilities by reducing or eliminating parasitic leakage components. In other words, the nonvolatile memory device in an example embodiment may extract the leakage component of the peripheral region in advance and may compensate for the extracted leakage component, and may sense a leakage of wordline defect, thereby increasing detection sensitivity.

FIG. 1 is a diagram illustrating a nonvolatile memory device 100 according to an example embodiment. Referring to FIG. 1, the nonvolatile memory device 100 may include a memory cell array 110, a row decoder 120, a page buffer circuit 130, an input/output circuit 140 (I/O), a control logic 150, a voltage generator 160, and a wordline leakage current detector 170.

The memory cell array 110 may be connected to the row decoder 120 through wordlines WLs or selection lines SSL and GSL. The memory cell array 110 may be connected to the page buffer circuit 130 through bitlines BLs. The memory cell array 110 may include a plurality of cell strings. Each channel of cell strings may be formed vertically or horizontally. Each of the cell strings may include a plurality of memory cells. The memory cells of a cell string may be coupled in series. Here, the plurality of memory cells may be programmed, erased, or read by voltages provided by the bitline BLs or the wordline WLs. A program operation may be performed by a page unit, and an erase operation may be performed by a block unit. In an example embodiment, the memory cell array 110 may include a three-dimensional memory cell array, and the three-dimensional memory cell array may include a plurality of NAND strings disposed along row and column directions.

The row decoder 120 may be implemented to select a memory block of the memory blocks BLK1 to BLKz (z is an integer of 2 or more) of the memory cell array 110 in response to an address ADD. The row decoder 120 may select a wordline of the wordlines WLs of the selected memory block in response to the row address X-ADD. The row decoder 120 may transmit the wordline voltage corresponding to an operation mode to the wordline of the selected memory block. During a program operation, the row decoder 120 may apply a program voltage and a verification voltage to the selected wordline and may apply a pass voltage to the non-selected wordline. During a read operation, the row decoder 120 may apply a read voltage to the selected wordline and a read pass voltage to the non-selected wordline.

The page buffer circuit 130 may be implemented to operate as a write driver or a sense amplifier. During a program operation, the page buffer circuit 130 may apply a bitline voltage corresponding to data to be programmed to the bitlines of the memory cell array 110. During a read operation or a verify read operation, the page buffer circuit 130 may sense data stored in the selected memory cell through the bitlines BLs. Each of the plurality of page buffers PB1 to PBn (where n is an integer greater than 1) included in the page buffer circuit 130 may be connected to at least one bitline. The page buffer circuit 103 may select at least one bitline among the bitline BLs in response to the column address Y-ADD.

The input/output circuit 140 may provide data to the page buffer circuit 130. This data may be externally provided to the nonvolatile memory device 100. The input/output circuit 140 may provide an externally provided command CMD to the control logic 150. Also, the input/output circuit 140 may output sensed and latched data to an external entity by the page buffer circuit 130.

The control logic 150 may be implemented to control the row decoder 120, the page buffer circuit 130, and the voltage generator 160 in response to a command CMD or a control signal transmitted from an external device. Also, the control logic 150 may be implemented to perform a cell count-based dynamic read operation.

The voltage generator 160 may be implemented to generate various types of wordline voltages and a well voltage. The wordline voltages may be applied to each wordline under control of the control logic 150. The well voltage may be supplied to a bulk (e.g., a well region) in which memory cells are formed. Wordline voltages applied to each wordline may include a program voltage, a pass voltage, a read voltage, read pass voltages, etc. Although not illustrated, the nonvolatile memory device 100 in an example embodiment may include a cell counter. The cell counter may be implemented to count memory cells corresponding to a specific threshold voltage range from data sensed in the page buffer circuit 130. For example, the cell counter may count the number of memory cells having a threshold voltage within a specific threshold voltage range by processing data sensed in each of the plurality of page buffers PB1 to PBn.

The wordline leakage current detector 170 may be implemented to determine whether there is leakage in a target wordline connected through a voltage path circuit such as the row decoder 120. The detection of a leakage of wordline through a voltage path circuit is disclosed by Samsung Electronics, described in US 2023-0025237, which is incorporated by reference in its entirety in this application. In particular, the wordline leakage current detector 170 may determine whether the target wordline is defective using trim information related to at least one of a level of the reference voltage or a gradient of the detected voltage during a test operation. Here, trim information may be extracted by using an EDS process in response to leakage current in the peripheral region, and the trim information may be stored in an E-fuse or a nonvolatile memory unit in the chip.

Trimming a voltage means adjusting the voltage by a small amount. The voltage may be trimmed higher or lower. In an example embodiment, the wordline leakage current detector 170 may compare a detected voltage of the selected target wordline with a reference voltage corresponding to first trim information in a test operation, and to output a good product signal corresponding to a result of the comparison. Here, the first trim information may be related to the level of the reference voltage. The wordline leakage current detector 170 may be implemented to indicate a presence or absence of a wordline defect by comparing a voltage of a specific wordline with the reference voltage.

The wordline leakage current detector 170 according to another example embodiment may calculate a difference value between a first count value at which the detected voltage reaches a first level and a second count value at which the detected voltage reaches a second level different from the first level in test operation, may compare the count value corresponding to the difference value and second trim information, and may output a good product signal corresponding to a result of the comparison. Here, the second trim information may be related to the gradient of the detected voltage.

The nonvolatile memory device 100 may detect a target wordline defect using trim information reflecting leakage current of the peripheral region. The nonvolatile memory device 100 using trim information reflecting leakage current of the peripheral region to detect the target wordline defect may have an improved detection sensitivity for wordline defects.

Figure 2:
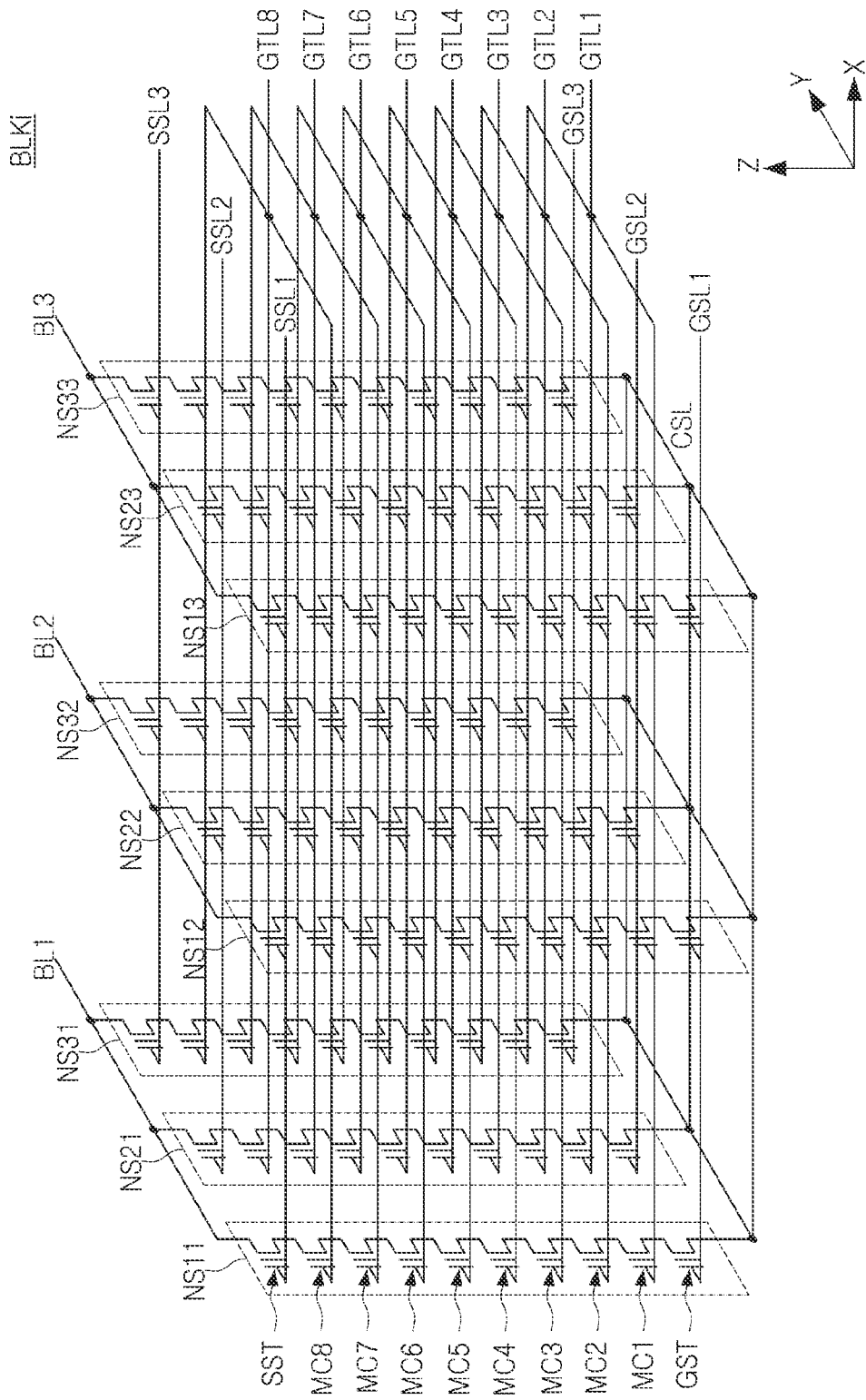
FIG. 2 is a diagram illustrating a circuit diagram of a memory block according to an example embodiment of the present disclosure.

FIG. 2 is a diagram illustrating a circuit diagram of a memory block BLKi (where the is an integer greater than 1) according to an example embodiment. A plurality of NAND strings included in the memory block BLKi may be disposed in a vertical direction from a substrate.

Referring to FIG. 2, memory block BLKi may include a plurality of NAND strings NS11 to NS33 connected between bitlines BL1, BL2, BL3 and a common source line CSL. Each of the plurality of NAND strings NS11 to NS33 may include a string select transistor SST, a plurality of memory cells MC1, MC2, . . . , MC8 and a ground select transistor GST. Referring to FIG. 2, each of the plurality of NAND strings NS11 to NS33 may include eight memory cells MC1, MC2, . . . , MC8. However, the number of memory cells is not limited thereto, and different numbers of memory cells may be disposed in a string without departing from the scope of the present disclosure.

Each string select transistor SST may be connected to corresponding string selection lines SSL1, SSL2, and SSL3. The plurality of memory cells MC1, MC2, . . . , MC8 may be connected to the corresponding gate lines GTL1, GTL2, . . . , GTL8, respectively. The gate lines GTL1, GTL2, . . . , GTL8 may correspond to wordlines or dummy wordlines. The ground select transistor GST of each string may be connected to a ground selection line of the ground selection lines GSL1, GSL2, and GSL3. Each string select transistor SST may be connected to corresponding bitlines BL1, BL2, and BL3, and the ground select transistor GST may be connected to the common source line CSL.

Wordlines (e.g., WL1) of a same height may be commonly connected, and the ground selection lines GSL1, GSL2, GSL3 and the string selection lines SSL1, SSL2, and SSL3 may be separated from each other, respectively. Referring to the memory block illustrated in FIG. 2 BLKi may be connected to eight gate lines GTL1, GTL2, . . . , GTL8 and three bitlines BL1, BL2, BL3, but is not limited thereto, and different configurations of a memory block are possible without departing from the scope of the present disclosure.

Figure 3:
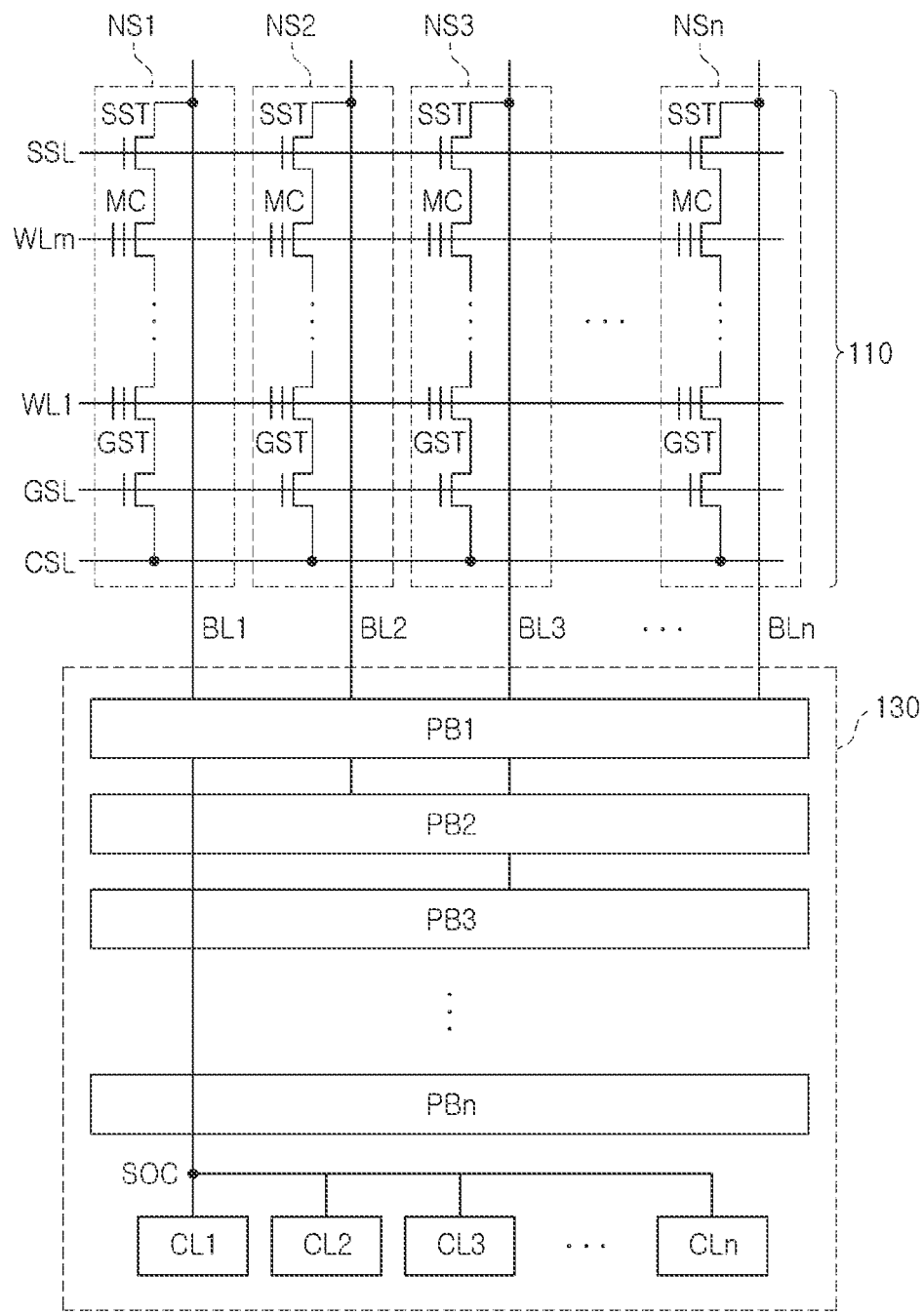
FIG. 3 is a diagram illustrating a connection relationship between a memory cell array and a page buffer circuit according to an example embodiment of the present disclosure.

FIG. 3 is a diagram illustrating a connection relationship between a memory cell array 110 and a page buffer circuit 130 according to an example embodiment. Referring to FIG. 3, the memory cell array 110 may include first to nth NAND strings NS1 to NSn (where n is an integer greater than 1). Each of the first to nth NAND strings NS1 to NSn may include a ground select transistor GST connected to a ground selection line GSL, a plurality of memory cells MC connected to a plurality of wordlines WL1 to WLm (where m is an integer greater than or equal to 2), respectively, and a string select transistor SST connected to a string selection line SSL. With each of the first to nth NAND strings NS1 to NSn, the ground select transistor GST, the plurality of memory cells MC and the string select transistor SST can be connected to each other in series.

The page buffer circuit 130 may include first to nth page buffers PB1 to PBn. The first page buffer PB1 may be connected to the first NAND string NS1 through the first bitline BL1, and the nth page buffer PBn may be connected to the nth NAND string NSn through the nth bitline BLn. For example, n may be 7, and the page buffer circuit 130 may have a structure in which eight-staged page buffers PB1 to PBn may be arranged in a row. For example, first to nth page buffers PB1 to PBn may be disposed in a row along an extension direction of the first to nth bitlines BL1 to BLn.

The page buffer circuit 130 may further include first to nth cache latches CL1 to CLn, respectively, corresponding to the first to nth page buffers PB1 to PBn. The page buffer circuit 130 may have a structure in which eight cache latches CL1 to CLn are arranged in a row. For example, the first to nth cache latches CL1 to CLn may be disposed in a row along an extension direction of the first to nth bitlines BL1 to BLn. A sense node of each of the first to nth page buffers PB1 to PBn may be commonly connected to a coupled sense node SOC. Also, the first to nth cache latches CL1 to CLn may be commonly connected to a coupled sense node SOC. Accordingly, the first to nth page buffers PB1 to PBn may be connected to the first to nth cache latches CL1 to CLn through the coupled sense node SOC.

As high-capacity and high-performance nonvolatile memory devices have been developed, the number of wordline layers for storing data has been increased. Accordingly, a space between adjacent wordlines may be reduced and the difficulty of the channel hole etching process may be increased. Due to process difficulty and structural vulnerability, wordline defects have been increased. A defect may cause a subtle leakage current in the wordline, which may cause a decrease in product quality. Electric Die Sorting (EDS) evaluation may be used to detect a defect by detecting a leakage current on the wordline. In an example embodiment, an EDS technique may reflect an influence of a parasitic leakage current component of a peripheral circuit and reduce or avoid errors in detecting wordline defects. For example, a first type error may result in a case of a chip having a large leakage current in a peripheral circuit, and a defect may be erroneously determined (a false-positive) even though there is no wordline defect. A second type error may result in a case of a chip having a small leakage current of the peripheral circuit PC, and a defect may not be sensed even though a wordline defect is present (a false-negative).

The nonvolatile memory device 100 in an example embodiment discloses a wordline leakage current detector reflecting leakage current of a peripheral circuit causing a false-positive/false-negative.

Figure 4:
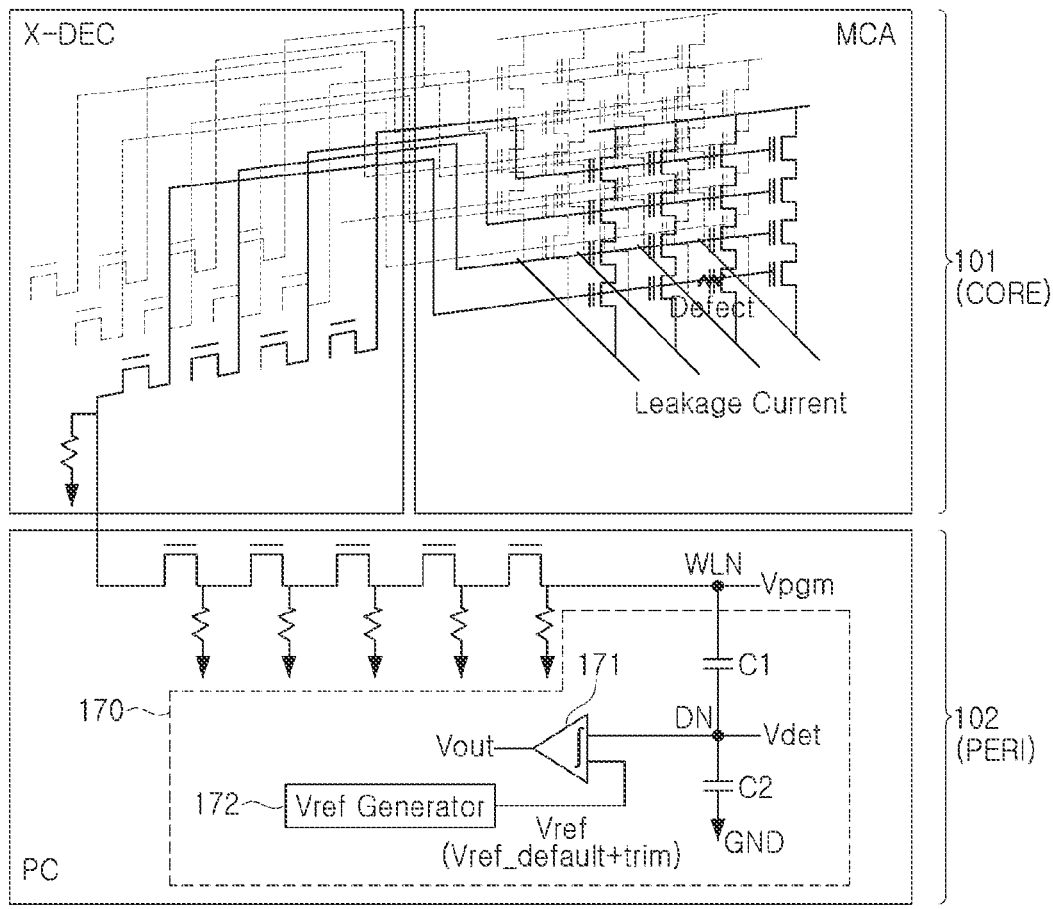
FIG. 4 is a diagram illustrating a wordline leakage current detector according to an example embodiment of the present disclosure.

FIG. 4 is a diagram illustrating a wordline leakage current detector 170 according to an example embodiment. Referring to FIG. 4, the nonvolatile memory device 100 may include a core chip 101 CORE and a peripheral chip 102 PERI. The core chip 101 may include a memory cell array 110 (MCA) and a row decoder X-DEC. The peripheral chip 102 PERI may be disposed on the core chip 101 and may include a wordline leakage current detector 170. For example, the peripheral chip 102 PERI may be disposed on the core chip 101. Here, the peripheral chip 102 may include components other than the MCA (memory cell array 110) and the row decoder X-DEC (row decoder 120) shown in FIG. 1.

The wordline leakage current detector 170 may include a first capacitor C1, a second capacitor C2, a comparator 171, and a reference voltage generator 172. The first capacitor C1 may be connected between a node WLN in which a test voltage, for example, wordline voltage (e.g., Vpgm) may be applied, and a detect node DN. Here, the detect node DN may output detected voltage Vdet. The second capacitor C2 may be connected between the detect node DN and a ground terminal GND. The comparator 171 may be implemented to compare the detected voltage Vdet with the reference voltage Vref and to output an output voltage Vout according to a result of the comparison. The reference voltage generator 172 may be implemented to generate a reference voltage Vref. Here, the reference voltage Vref may be determined according to a value extracted from an EDS process. The extracted value may be stored in an internal or external storage unit (e.g., an E-fuse, or a nonvolatile memory unit) of the reference voltage generator 172. In an example embodiment, the reference voltage Vref may be different for each chip. For example, the reference voltage Vref may be adjusted (e.g., trimmed) for testing each chip, which may include a cell region (e.g., the memory cell array 110) and a peripheral region.

Figure 5A:
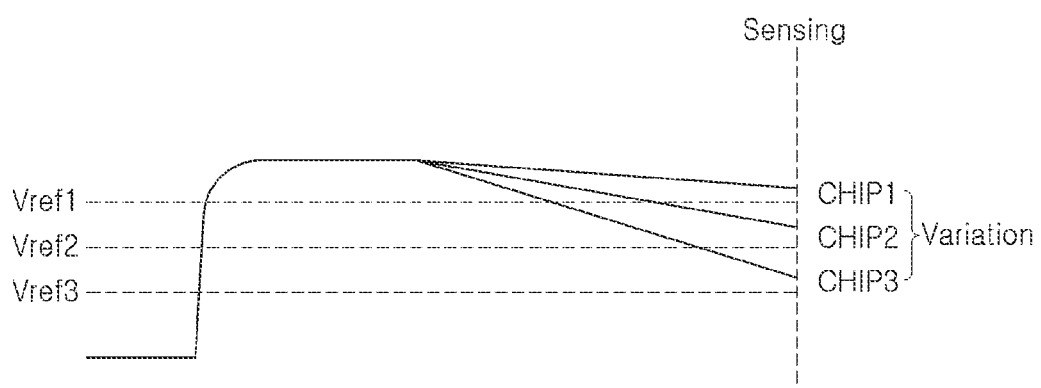
FIG. 5A and FIG. 5B are diagrams illustrating a process of extracting a reference voltage according to an example embodiment of the present disclosure.
Figure 5B:
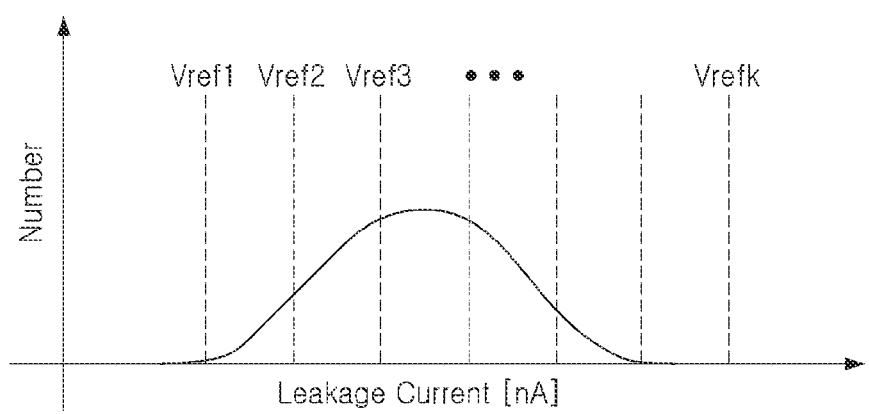

FIG. 5A and FIG. 5B are diagrams illustrating a process of extracting a reference voltage Vref according to an example embodiment. As illustrated in FIG. 5A, in an EDS process, each of the chips CHIP1, CHIP2, and CHIP3 may have respective reference voltages Vref1, Vref2, and Vref3 indicating whether a sense operation passes/fails. According to an example embodiment, a wordline leakage current indicative of a defect may vary for the different chips. In a case where the chips may be collectively screened, a common reference voltage level may be used for the chips for examining wordline and leakage components. In this case, a chip having a large peripheral circuit leakage current may be incorrectly determined to have a defect (e.g., a false-positive detection). To prevent a false-positive detection (e.g., detecting a defect when no wordline defect is present), a screen point may be relaxed, which may result in a decrease in detection accuracy.

According to an example embodiment, a method of detecting a wordline leakage current may eliminate variations in the detection of leakage currents between chips by setting different reference voltage levels for one or more of the chips. In other words, a method of detecting leakage current in an example embodiment may eliminate variation between chips by determining a reference voltage Vref for each chip in response to a leakage current of each chip.

Figure 6:
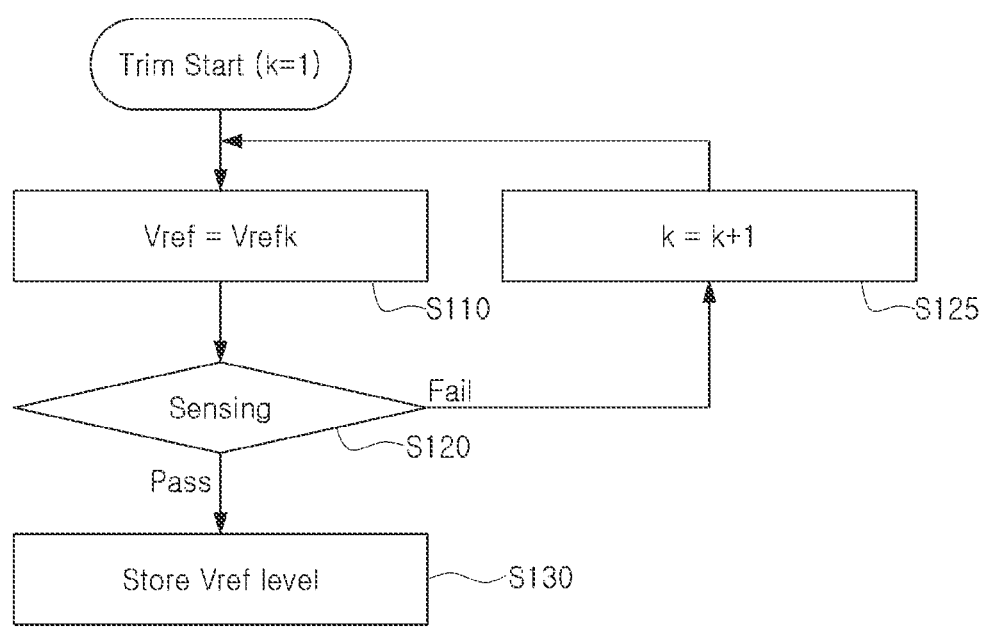
FIG. 6 is a flowchart illustrating an operation of determining a reference voltage level of a nonvolatile memory device according to an example embodiment of the present disclosure.

FIG. 6 is a flowchart illustrating an operation of determining a reference voltage level of a nonvolatile memory device according to an example embodiment. Referring to FIG. 6, an operation of determining a reference voltage Vref of the nonvolatile memory device 100 may be performed as described herein. In an EDS process operation and referring to FIG. 4, a program voltage Vpgm may be applied to a node WLN, and as detected voltage Vdet, a kth reference voltage Vrefk among plurality of reference voltages Vref1, ... Vrefk (where k is an integer greater than or equal to 2) may be applied (S110). Here, an initial k may be 1. The wordline leakage current detector 170 may compare a default reference voltage Vref_default with the first reference voltage Vref1 (S120). As a result of the comparison, when sensing fails, k may be increased by 1, and S110 operation may be performed (S125). As a result of the comparison, when sensing passes, the detected voltage Vdet (e.g., one of the reference voltages Vref1, ... Vrefk corresponding to a value of k) may be stored as reference voltage Vref in a nonvolatile memory or E-fuse (S130). In an example embodiment, the value stored in the nonvolatile memory or E-fuse may be a trim value reflected in the default reference voltage Vref_default.

A method of extracting the reference voltage Vref in an example embodiment may include measuring a leakage current component of a peripheral circuit of a chip in an EDS process. Here, a method of measuring the leakage current may be implemented to identify a pass/fail by gradually lowering a level of the reference voltage Vref as described with reference to FIG. 9A.

Figures 7, 8:
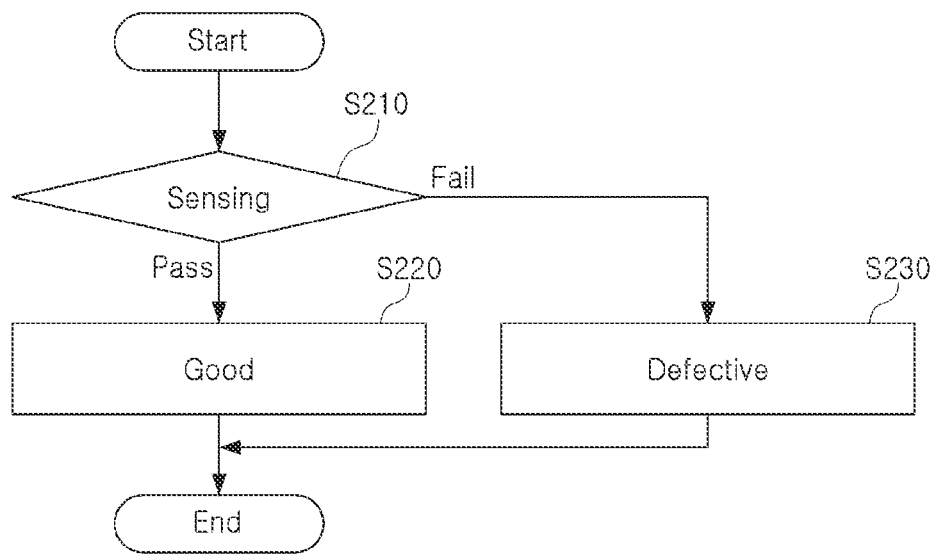
FIG. 7 is a table relating to reference voltage extraction for each chip according to an example embodiment of the present disclosure.
FIG. 8 is a flowchart illustrating an operation of detecting a wordline defect of a nonvolatile memory device according to an example embodiment of the present disclosure.

FIG. 7 is a table related to reference voltage extraction for a plurality of chips according to an example embodiment. Referring to FIG. 7, by sensing a reference voltage several times in the wordline leakage current detector 170 in an EDS process, a plurality of levels (e.g., Vref1, Vref2, and Vref3) of the reference voltage Vref may be stored. The reference voltages may be stored on-chip. Here, the reference voltage Vref may be stored on-chip using an E-fuse. When using the wordline leakage current detector 170 in real time, the wordline leakage current may be determined as a reference voltage Vref determined for a chip currently under test, which may reduce or eliminate a parasitic leakage component of the peripheral circuit. The wordline leakage current may be used for an in-process testing. In an embodiment, the wordline leakage current may be used for a security code. For example, trim information may be used in a security code to recover data.

FIG. 8 is a flowchart illustrating an operation of detecting a wordline defect of a nonvolatile memory device according to an example embodiment. Referring to FIG. 8, an operation of detecting a wordline defect of nonvolatile memory device 100 may be as follows. Depending on an external request or an internal policy, the nonvolatile memory device 100 may perform an operation of detecting a wordline defect for a target wordline. The target wordline and the wordline leakage current detector 170 may be electrically connected to each other. A program voltage Vpgm may be applied to a node WLN. The wordline leakage current detector 170 may sense a pass/fail for the target wordline by comparing the detected voltage Vdet with the reference voltage Vref (S210). When the sensing passes, the target wordline may be processed as a good product (S220). When the sensing fails, the target wordline may be processed as defective product (S230). A repair operation of replacing the defective wordline with a redundant wordline may be performed.

The nonvolatile memory device in an example embodiment may extract a gradient of the reference voltage Vref using a counter.

Figure 9A:
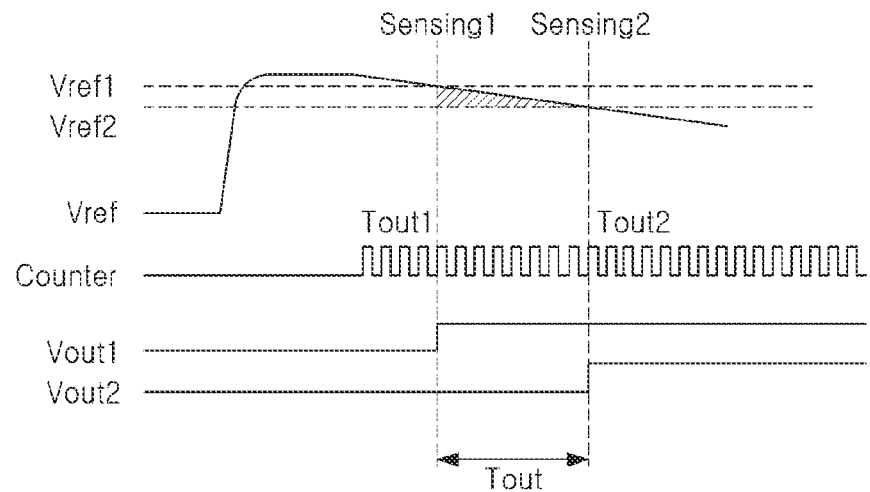
FIG. 9A and FIG. 9B are diagrams illustrating a process of extracting a reference voltage of a nonvolatile memory device according to an example embodiment of the present disclosure.
Figure 9B:
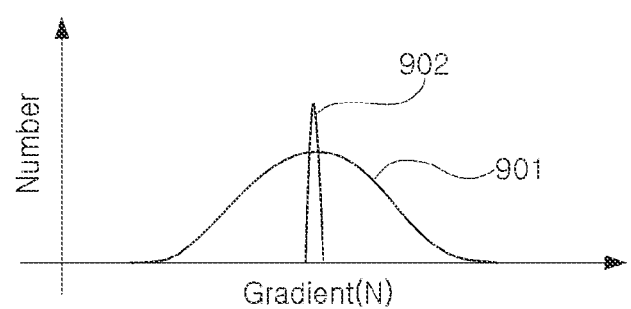

FIG. 9A and FIG. 9B are diagrams illustrating a process of extracting a reference voltage of a nonvolatile memory device according to an example embodiment. As illustrated in FIG. 9A, in an EDS process, a first sensing operation and a second sensing operation may be performed while lowering a level of the reference voltage Vref. Simultaneously, a count value at which the sensing operation, that is, the times Tout1 and Tout2, may be stored. The count value may be determined by the counter. The first sensing time Tout1 is the time period to reach the first output voltage Vout1, that is, the time period from the beginning of the counter until the first output voltage Vout1 is sensed. The second sensing time Tout2 may be the time period to reach the second output voltage Vout2, that is, the time period from the beginning of the counter until the second output voltage Vout2 is sensed. The value obtained by subtracting the first sensing time Tout1 from the second sensing time Tout2 may be extracted as the time Tout. The time Tout may correspond to the reference voltage Vref. The method of extracting a gradient in an example embodiment may include a first sensing operation and a second sensing operation, extracting a difference Tout of a clock count value of the corresponding counter in each case, and storing the extracted value in an E-fuse of the corresponding chip.

As illustrated in FIG. 9B, a method for testing a group of chips may result in variations in the detection of leakage currents for the chips due to a common reference voltage 901. In an example embodiment, a gradient screen method may include extracting a gradient of peripheral leakage 902 for each chip. By determining the gradient for each chip, variations in the detection of leakage currents for the chips can be reduced or eliminated by using the gradients generated for each of the chips during a test operation.

Figure 10:
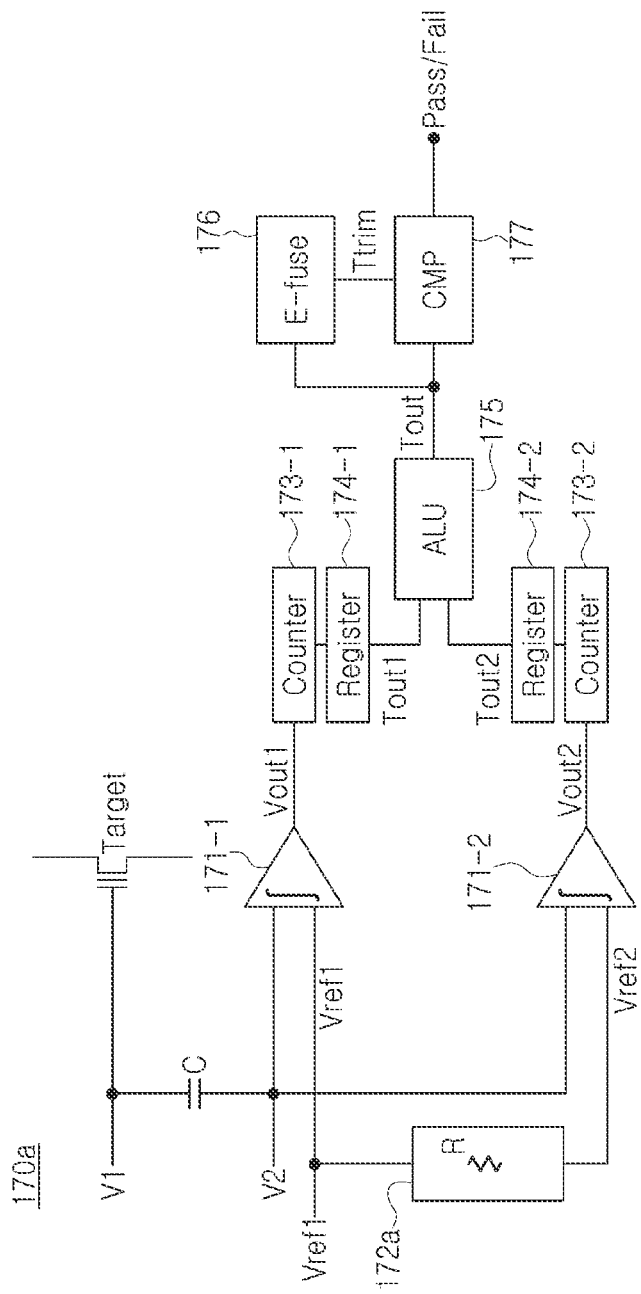
FIG. 10 is a diagram illustrating a wordline leakage current detector of a nonvolatile memory device according to another example embodiment of the present disclosure.

FIG. 10 is a diagram illustrating a wordline leakage current detector 170a of a nonvolatile memory device according to another example embodiment. Referring to FIG. 10, the wordline leakage current detector 170a may include a capacitor C, a first comparator 171-1, a second comparator 171-2, a fuse trim set 172a, a first counter 173-1, a second counter 173-2, a first register 174-1, a second register 174-2, a calculation unit 175, a storage unit 176, and a verification comparator 177.

The first comparator 171-1 may be implemented to compare a corresponding detected voltage V2 with a first reference voltage Vref1 and to output the first output voltage Vout1 when applying the test voltage V1 (program voltage) to the selected target wordline in a test operation. Here, the detected voltage V2 may be coupled to the test voltage V1 by the capacitor C1. The second comparator 171-2 may be implemented to compare the detected voltage V2 with the second reference voltage Vref2 and to output the second output voltage Vout2. Here, the second reference voltage Vref2 may be different from the first reference voltage Vref1. The second reference voltage Vref2 may be generated by trimming the first reference voltage Vref1. For example, the second reference voltage Vref2 may be generated by trimming the first reference voltage Vref1 by the fuse trim set 172a.

The first counter 173-1 may be implemented to output a first count value by counting until the first output voltage Vout1 reaches a first level. The second counter 173-2 may be implemented to output a second count value by counting until the second output voltage Vout2 reaches a second level different from the first level. The first register 174-1 may be implemented to store the first count value. The second register 174-2 may be implemented to store the second count value. The calculation unit 175 may be implemented to calculate a difference value between the first count value and the second count value. The storage unit 176 may be implemented to store trim information. Here, the trim information may store a count value corresponding to a gradient of the detected voltage. The verification comparator 177 (CMP) may compare the difference value of the calculation unit 175 with a count value corresponding to the trim information of the storage unit 176 and to output a good product signal (pass/fail) corresponding to a result of the comparison.

Figure 11:
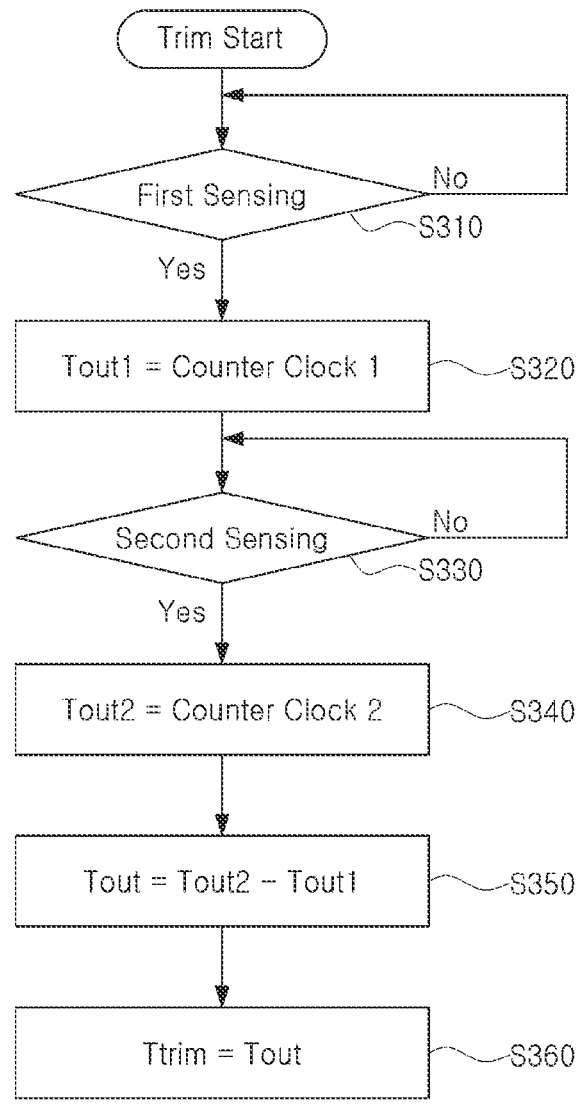
FIG. 11 is a flowchart illustrating an operation of extracting a reference voltage of a nonvolatile memory device according to an example embodiment of the present disclosure.

FIG. 11 is a flowchart illustrating an operation of extracting a reference voltage of a nonvolatile memory device according to an example embodiment. Referring to FIGS. 9 to 11, an operation of extracting reference voltage of the nonvolatile memory device may be performed as described herein.

In an EDS process, a gradient of the peripheral leakage component of the chip may be measured. A process of measuring a leakage component may be performed as follows. A first sensing may be performed (S310). A voltage V2 may be compared with the first reference voltage Vref1, and when a first result of the comparison Vout1 passes (Yes), the first counter 173-1 may output a first count value Tout1 (S320). The first count value Tout1 may be stored in the first register 174-1. When a result of the comparison fails (No), the S310 operation may be repeated. A second sensing may be performed (S330). The voltage V2 may be compared with the second reference voltage Vdet1, and when a second result of the comparison Vout2 passes (Yes), the second counter 173-2 may output a second count value Tout2 (S340). The second count value Tout2 may be stored in the second register 174-2. When a result of the comparison fails (No), S330 operation may be repeated. The calculation unit 175 may subtract the first count value Tout1 from the second count value Tout2 (S350). The storage unit 176 may store the calculated leakage gradient value Tout as a trim value Ttrim.

A method of extracting leakage gradient in an example embodiment may perform a first sensing operation and a second sensing operation, and may store a clock count value Tout obtained during the sensing. With the first reference voltage Vref1 and the second reference voltage Vref2 are determined, the clock count value Tout may represent the gradient of the corresponding chip. Since the gradient of each chip may be stored on-chip, compared with the corresponding value and screened, the peripheral parasitic leakage component may be compensated.

Figure 12:
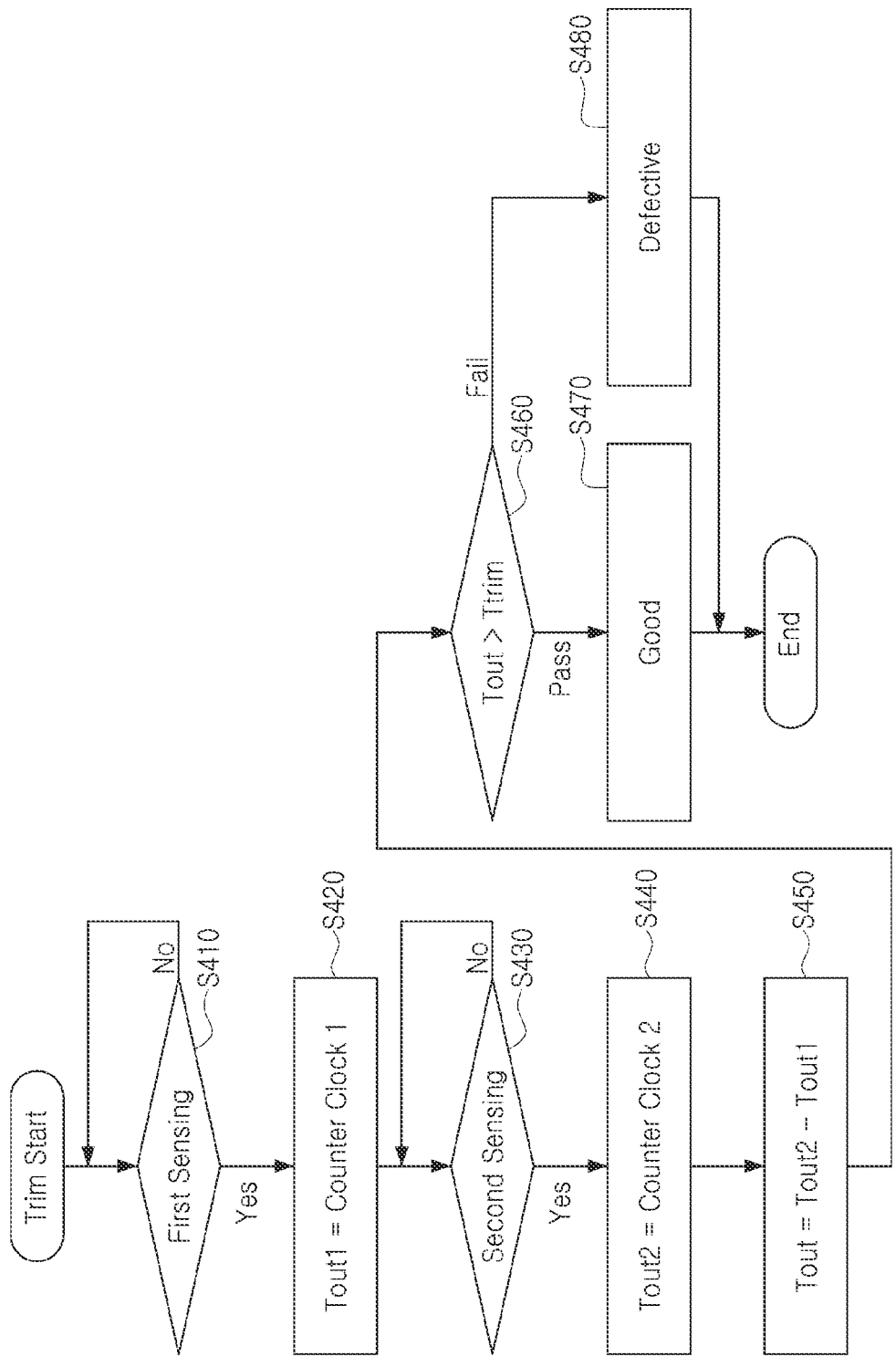
FIG. 12 is a flowchart illustrating an operation of detecting a wordline leakage current of a nonvolatile memory device according to another embodiment of the present disclosure.

FIG. 12 is a flowchart illustrating an operation of detecting a wordline leakage current of a nonvolatile memory device 100 according to another embodiment. Referring to FIGS. 1 to 12, an operation of detecting wordline leakage current may be performed as described herein.

Depending on an external request or an internal policy, the nonvolatile memory device 100 may perform an operation of detecting wordline leakage current for a target wordline as follows. A program voltage may be applied to the target wordline, and the wordline leakage current detector 170a may perform a first sensing operation. When the first sensing operation fails (No), the first sensing operation may continue to be performed. When the first sensing operation passes (Yes), the first count value Tout1 may be stored in a first register 174-1 (S420). The wordline leakage current detector 170a may perform a second sensing operation. When the second sensing operation fails (No), the second sensing operation may continue to be performed. When the second sensing operation passes (Yes), the second count value Tout2 may be stored in a second register 174-2 (S420). A calculation unit 175 may calculate a difference between the first count value Tout1 and the second count value Tout2 (Tout=Tout2−Tout1, leakage current gradient). A verification comparator 177 may compare the calculated leakage current gradient Tout with the stored leakage current gradient Ttrim. For example, it may be determined whether the calculated leakage current gradient Tout is greater than the stored leakage current gradient Ttrim (S460). When the calculated leakage current gradient Tout is greater than the stored leakage current gradient Ttrim, the target wordline may be treated as a good product as a verification pass (S470). When the calculated leakage current gradient Tout is not greater than the stored leakage current gradient Ttrim, the target wordline may be processed as a defect as verification fails (S480).

Figure 13:
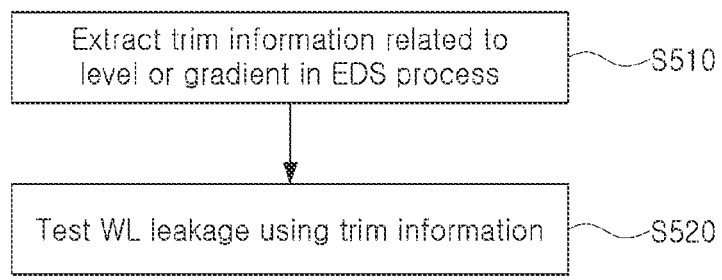
FIG. 13 is a flowchart illustrating a method of operating a nonvolatile memory device according to an example embodiment of the present disclosure.

FIG. 13 is a flowchart illustrating a method of operating a nonvolatile memory device 100 according to an example embodiment. Referring to FIGS. 1 to 13, the nonvolatile memory device 100 may operate as follows. The nonvolatile memory device 100 may extract trim information related to at least one of a level of the reference voltage of the wordline leakage current detector or a gradient of the detected voltage of the wordline leakage current detector in an EDS process (S510). A method of extracting a level of the reference voltage may be the same as described with reference to FIG. 4, FIG. 5A, FIG. 5B, FIG. 6, and FIG. 7. A method of extracting a gradient of the detected voltage may be the same as described with reference to FIG. 9A, FIG. 9B, FIG. 10, and FIG. 11. The extracted level or gradient-related trim information may be stored in an internal E-fuse. According to an external request or an internal policy, the nonvolatile memory device 100 may test whether the target wordline has leakage using the trim information by the wordline leakage current detector (S520).

In an example embodiment, it may be determined whether the operation of detecting the wordline leakage current detector outputs a pass at a reference level corresponding to a default value, and it can be determined whether the operation of detecting the wordline leakage current detector outputs a pass by lowering the reference level to a predetermined level. In another example embodiment, a first count value until the detected voltage reaches the first reference voltage may be output, a second count value until the detected voltage reaches a second reference voltage different from the first reference voltage may be output, and trim information corresponding to a difference value between the second count value and the first count value may be stored in the storage unit. In an example embodiment, in a test operation, by calculating the difference value between the count value at which the detected voltage reaches the first reference voltage and the count value at which the detected voltage reaches the second reference voltage, and by comparing the calculated difference value with the count value corresponding to the trim information, the wordline leakage current detector may be shared in at least two planes.

Figure 14A:
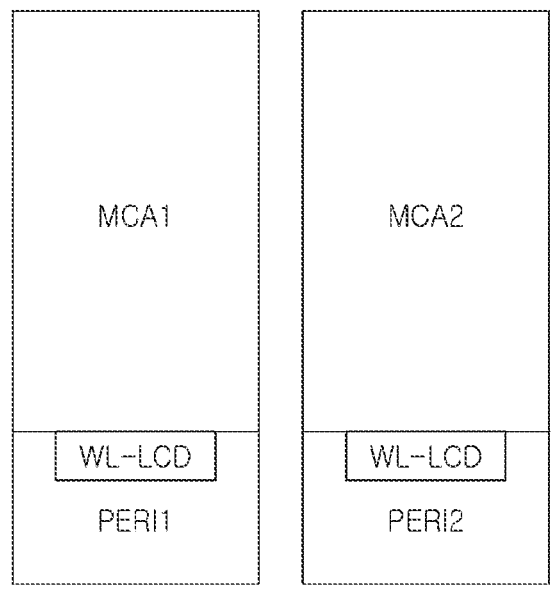
FIG. 14A and FIG. 14B are diagrams illustrating the arrangement of a wordline leakage current detector according to an example embodiment of the present disclosure.
Figure 14B:
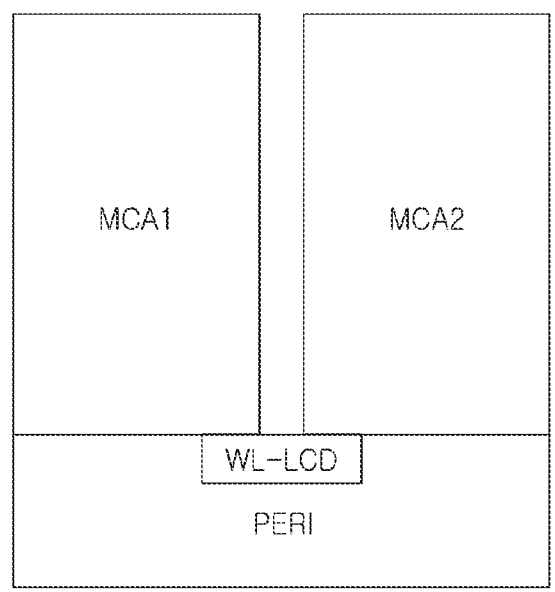

FIG. 14A and FIG. 14B are diagrams illustrating the arrangement of a wordline leakage current detector according to an example embodiment. The wordline leakage current detector WL-LCD may determine whether the selected target wordline among a plurality of wordlines in a first memory cell array MCA1 and a second memory cell array MCA2 is defective using trim information related to at least one of a level of the reference voltage or a gradient of the detected voltage during a test operation.

Referring to FIG. 14A, wordline leakage current detectors WL-LCD may be disposed in the peripheral region corresponding to a plane of each of the first memory cell array MCA1 and the second memory cell array MCA2. In an example embodiment, the first wordline leakage current detector which may determine whether a target wordline among wordlines of a first memory cell array MCA1 has leakage and a second wordline leakage current detector which may determine whether a target wordline among wordlines of a second memory cell array MCA2 has leakage may be included. In an example embodiment, the nonvolatile memory device may further include a first peripheral chip PERI1 having a first wordline leakage current detector, and a second peripheral chip PERI2 having a second wordline leakage current detector. In an example embodiment, the first peripheral chip PERI1 may be disposed below the first memory cell array MCA1, and the second peripheral chip PERI2 may be disposed below the second memory cell array MCA. Referring to FIG. 14B, the wordline leakage current detector WL-LCD may be disposed in the peripheral region shared by a plurality of arrays (e.g., the first memory cell array MCA1 and the second memory cell array MCA2). In an example embodiment, the nonvolatile memory device may further include a peripheral chip PERI having a wordline leakage current detector WL-LCD. In an example embodiment, the peripheral chip PERI may be disposed below the first and second memory cell arrays MAC1 and MAC2.

Figure 15:
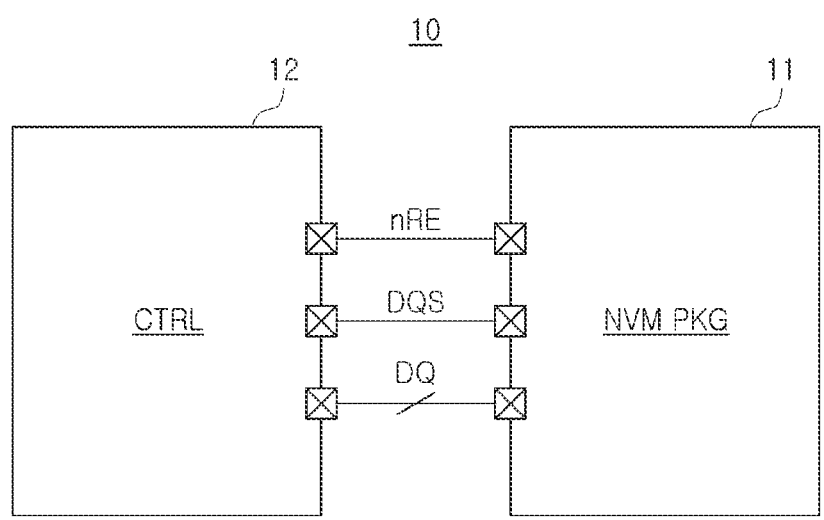
FIG. 15 is a diagram illustrating a storage device according to an example embodiment of the present disclosure.

FIG. 15 is a diagram illustrating a storage device 10 according to an example embodiment. Referring to FIG. 15, the storage device 10 may include a nonvolatile memory package 11 (NVM PKG) and a controller 12 (CTRL). The controller 12 (CTRL) may control the nonvolatile memory package 11 (NVM PKG).

The nonvolatile memory package 11 (NVM PKG) may include an interface chip (e.g., frequency boosting interface chip (FBI), or "buffer chip") and a plurality of nonvolatile memory devices connected to internal channels. The interface chip FBI may be connected to the controller 12 through a channel. Here, channel CHI may be connected to a first internal channel or a second internal channel through an interface chip. The interface chip may include a retraining check circuit, which may internally determine the need for retraining. In an example embodiment, the retraining check circuit may include a built-in self-test (BIST) circuit, an oscillator, or a delayed locked loop circuit (DLL). Also, the interface chip may compatibly implement an interface protocol communicating with the controller 12 and an interface protocol communicating with nonvolatile memory devices. Each of the nonvolatile memory devices may be implemented to store data. A plurality of nonvolatile memory devices may be connected to each of the internal channels. In an example embodiment, in the nonvolatile memory package 11, nonvolatile memory devices may be implemented in a stacked structure. Here, each of the plurality of nonvolatile memory devices may be implemented to perform a dump sequence operation as described with reference to FIGS. 1 to 14.

In an example embodiment, the nonvolatile memory package 11 may be implemented in a structure in which nonvolatile memory devices are stacked. Here, each of the stacked nonvolatile memory devices may be implemented to include a memory cell array including a plurality of memory cells connected to a plurality of wordlines and a plurality of bitlines, and a wordline leakage current detector which may determine whether a selected wordline is defective among a plurality of wordlines using trim information related to at least one of a level of the reference voltage or a gradient of the detected voltage during a test operation as described with reference to FIGS. 1 to 14B. Here, the test operation may be performed according to a request from the controller 12 or an internal policy.

The controller 12 (CTRL) may be implemented to control operations of the nonvolatile memory package 11. The controller 12 may perform functions for data management of the nonvolatile memory package 11, such as address mapping, error correction, garbage collection, wear-leveling, bad block management, or data recovery. Here, these functions may be implemented in terms of hardware, software, firmware, or a combination thereof.

Figure 16:
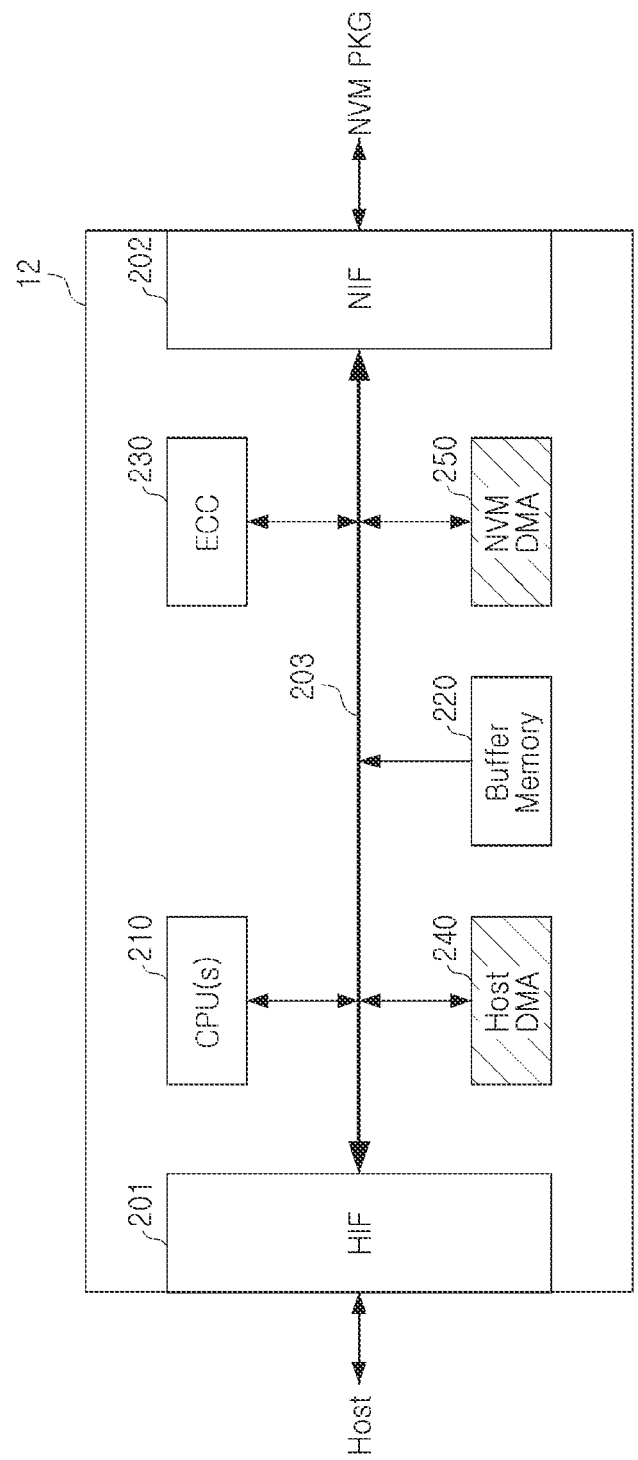
FIG. 16 is a diagram illustrating a controller according to an example embodiment of the present disclosure.

FIG. 16 is a diagram illustrating a controller 12 according to an example embodiment. Referring to FIG. 16, the controller 12 may include a host interface (HIF) 201, a nonvolatile memory interface circuit 202 (NIF), a bus 203, at least one processor 210 (CPCs), a buffer memory 220, an error correction circuit 230 (ECC), a host DMA circuit 240, and a nonvolatile memory DMA circuit 250.

The host interface 201 may be implemented to transmit/receive packets with a host. A packet transmitted from the host to the host interface 201 may include a command or write data to a nonvolatile memory device. A packet transmitted from the host interface 201 to the host may include a response to a command or read data from a nonvolatile memory device.

The nonvolatile memory interface circuit 202 may transmit write data to the nonvolatile memory device or may receive read data from the nonvolatile memory device. The nonvolatile memory interface circuit 202 may be implemented to comply with standard protocols such as JEDEC (Joint Electron Device Engineering Council) Toggle or ONFI (Open NAND Flash Interface).

At least one processor 210 (CPUs) may be implemented to control operations of the storage device 10. The processor 210 may perform various management such as manages cache/buffer management, firmware management, garbage collection management, wear leveling management, data deduplication management, read refresh/reclaim management, bad block management, multi-stream management, mapping management between host data and nonvolatile memory, quality of service (QOS) management, system resource allocation management, nonvolatile memory queue management, read level management, erase/program management, hot/cold data management, power loss protection management, dynamic thermal management, initialization management, or redundant array of inexpensive disk (RAID). These management operations may be implemented in terms of hardware, firmware, software, or a combination thereof.

The buffer memory 220 may temporarily store data to be written to a nonvolatile memory device or read data from a nonvolatile memory device. In an example embodiment, the buffer memory 220 may be configured as a component included in the controller 12. In another example embodiment, the buffer memory 220 may be disposed external to the controller 12. Also, the buffer memory 220 may be implemented as a volatile memory (e.g., static random access memory (SRAM), dynamic RAM (DRAM), synchronous RAM (SDRAM), or the like) or a nonvolatile memory (flash memory, phase-change RAM (PRAM)), magneto-resistive RAM (MRAM), resistive RAM (ReRAM), ferro-electric RAM (FRAM), or the like).

The error correction circuit 230 may generate an error correction code (ECC) during a program operation and may restore data using the error correction code during a read operation. That is, the error correction circuit 230 may generate an error correction code ECC for correcting a fail-bit or an error-bit of data received from a nonvolatile memory device. Also, the error correction circuit 230 may generate data to which parity bits are added by performing error correction encoding on data provided to the nonvolatile memory device. Parity bits may be stored in the nonvolatile memory device.

The error correction circuit 230 may perform error correction decoding on data output from a nonvolatile memory device. The error correction circuit 230 may correct errors using parity bits. The error correction circuit 1230 may correct an error using a low density parity check (LDPC) code, BCH code, turbo code, Reed-Solomon code, convolution code, recursive systematic code (RSC), coded modulation such as trellis-coded modulation (TCM), or block coded modulation (BCM). In a case that error correction is not possible in the error correction circuit 230, a read retry operation may be performed.

The packet manager may generate a packet according to protocol of an interface negotiated with the host, or may parse various data from a packet received from the host. The encryption device may perform at least one of an encryption operation or a decryption operation on data input to the controller 12 using a symmetric-key algorithm. The encryption device may perform encryption and decryption of data using the advanced encryption standard (AES) algorithm. An encryption device may include an encryption module and a decryption module. In an example embodiment, an encryption device may be implemented in terms of hardware, software, firmware, or a combination thereof. The encryption device may perform a self-encryption disk (SED) function or a trusted computing group (TCG) security function. The SED function may store encrypted data in a nonvolatile memory device using an encryption algorithm or decrypt encrypted data from a nonvolatile memory device. The encryption/decryption operation may be performed using an internally generated encryption key. The TCG security function may provide a mechanism enabling access control to user data of the storage device 10. For example, the TCG security function may perform an authentication procedure between an external device and the storage device 10. In an example embodiment, the SED function or TCG security function may be optionally selected.

The host DMA circuit 240 may be implemented to control a DMAn operation between the host device and the controller 12. The host DMA circuit 240 may perform an operation of storing data input from a host device through the host interface 201 in the buffer memory 220 during a program operation under control of a host controller. The host DMA circuit 240 may perform an operation of outputting data stored in the buffer memory 220 to a host device through the host interface 201 during a read operation. In an example embodiment, the host DMA circuit 240 may be implemented to be included in the host controller as a component of the host controller.

The nonvolatile memory DMA circuit 250 may be implemented to control a DMAn operation between the controller 12 and the nonvolatile memory device 100. The nonvolatile memory DMA circuit 250 may perform an operation of outputting data stored in the buffer memory 220 to a nonvolatile memory device through the nonvolatile memory interface circuit 202 during a program operation under control of a nonvolatile memory controller. The nonvolatile memory DMA circuit 250 may perform an operation of reading data stored in a nonvolatile memory device through the nonvolatile memory interface circuit 202 during a read operation.

A nonvolatile memory device according to an example embodiment may be implemented as a vertical memory device.

Figure 17:
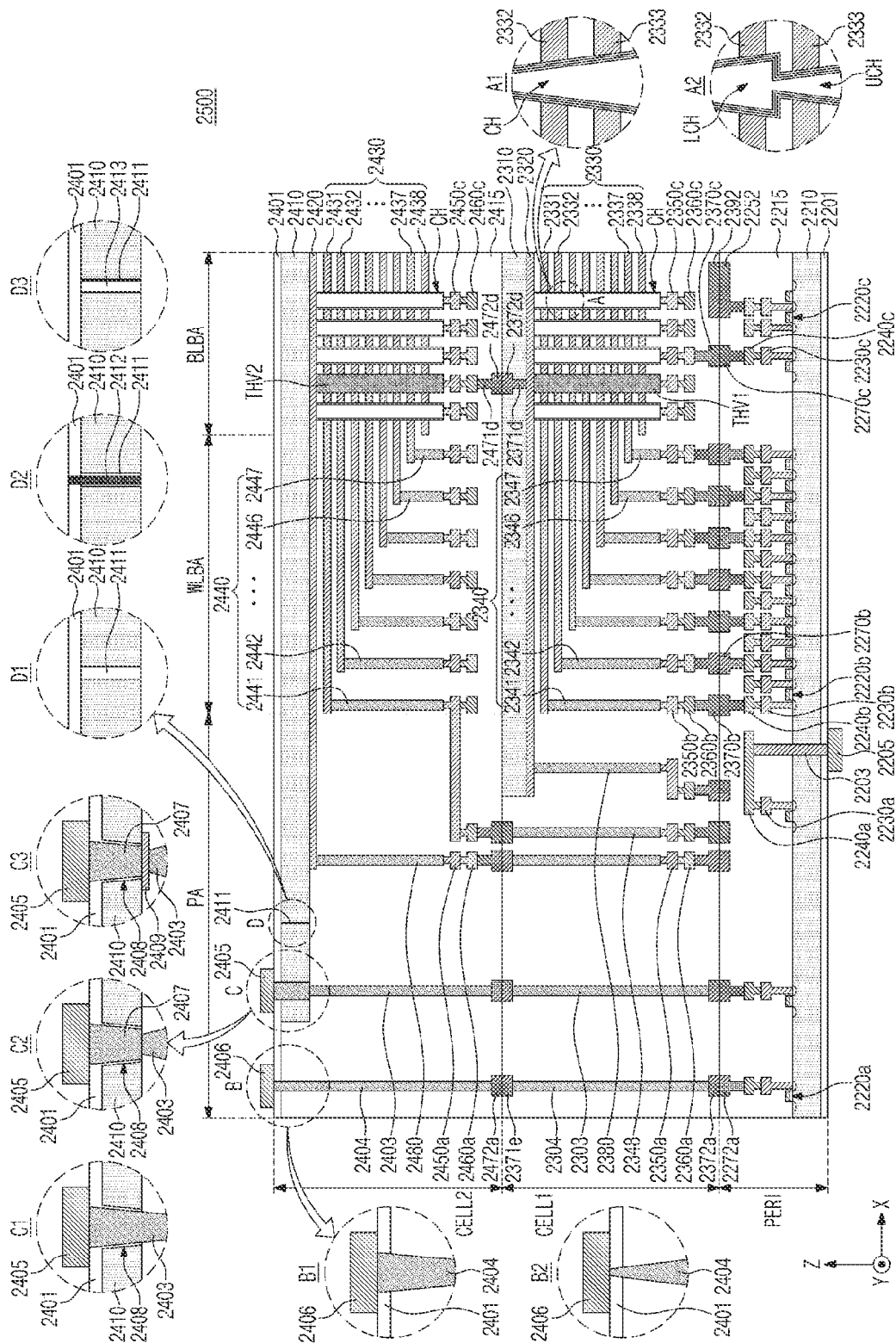
FIG. 17 is a diagram illustrating a nonvolatile memory device according to an example embodiment of the present disclosure.

FIG. 17 is a diagram illustrating a vertical nonvolatile memory device according to an example embodiment. Referring to FIG. 17, a nonvolatile memory device 2500 may have a chip-to-chip C2C structure. Here, the C2C structure may include manufacturing at least one upper chip including a cell region CELL and a lower chip including a peripheral circuit region PERI, respectively, and connecting at least one upper chip and lower chip to each other (e.g., by bonding). In an example embodiment, the bonding method may refer to a method of electrically or physically connecting the bonding metal pattern disposed on an uppermost metal layer of the upper chip to the bonding metal pattern disposed on an uppermost metal layer of the lower chip. For example, when the bonding metal patterns are formed of copper (Cu), the bonding method may be a Cu—Cu bonding method. In another example embodiment, bonding metal patterns may also be formed of aluminum (Al) or tungsten (W).

The nonvolatile memory device 2500 may include at least one upper chip including a cell region. For example, as illustrated in FIG. 17, a nonvolatile memory device 2500 may be implemented to include two upper chips. However, this is merely an example, and the number of upper chips is not limited thereto. When the nonvolatile memory device 2500 is implemented to include two upper chips, the nonvolatile memory device 2500 may be manufactured by manufacturing a first upper chip including a first cell region CELL1, a second upper chip including a second cell region CELL2 and a lower chip including a peripheral circuit region PERI, respectively, and connecting the first upper chip, the second upper chip and the lower chip to each other by bonding. The first upper chip may be inverted and connected to the lower chip by bonding, and the second upper chip may also be inverted and connected to the first upper chip by bonding. In the description provided herein, the upper portion and the lower portion of the first and second upper chips may be defined with respect to the state before the first upper chip and the second upper chip are inverted. That is, in FIG. 17, the upper portion of the lower chip may refer to the upper portion defined in the +Z-axis direction, and the upper portion of each of the first and second upper chips may refer to the upper portion defined in the −Z-axis direction. However, this is merely an example, and one of the first upper chip and the second upper chip may be inverted and connected to each other by bonding.

Each of the peripheral circuit region PERI and the first cell region CELL1 and the second cell region CELL2 of the nonvolatile memory device 2500 may include an external pad bonding region PA, a wordline bonding region WLBA, and a bitline bonding region BLBA.

The peripheral circuit region PERI may include a first board 2210 and a plurality of circuit devices 2220a, 2220b, and 2220c disposed on the first board 2210. An interlayer insulating layer 2215 including one or more insulating layers may be provided on the plurality of circuit devices 2220a, 2220b, and 2220c, and a plurality of metal wirings may be provided in the interlayer insulating layer 2215 to connect the plurality of circuit devices 2220a, 2220b, and 2220c. For example, the plurality of metal wirings may include first metal wirings 2230a, 2230b, and 2230c connected to a plurality of circuit devices 2220a, 2220b, and 2220c, and second metal wirings 2240a, 2240b, and 2240c disposed on first metal wirings 2230a, 2230b, and 2230c. The plurality of metal wirings may be formed of at least one of various conductive materials. For example, the first metal wirings 2230a, 2230b, and 2230c may be formed of tungsten having relatively high electrical resistivity, and the second metal wirings 2240a, 2240b, and 2240c may be formed of copper having relatively low electrical resistivity.

Here, the first metal wiring 2230a, 2230b, and 2230c and the second metal wiring 2240a, 2240b, and 2240c are described, but an example embodiment thereof is not limited thereto, and at least one additional metal wiring may be disposed on the second metal wirings 2240a, 2240b, and 2240c. In this case, the second metal wirings 2240a, 2240b, and 2240c may be formed of aluminum. Also, at least a portion of the additional metal wiring disposed on the second metal wirings 2240a, 2240b, and 2240c may be formed of copper having lower electrical resistivity than that of aluminum of the second metal wirings 2240a, 2240b, and 2240c.

Each of the first and second cell regions CELL1 and CELL2 may include at least one memory block. The first cell region CELL1 may include a second board 2310 and a common source line 2320. On the second board 2310, a plurality of wordlines 2331 to 2338 (2330) may be stacked in the direction (Z-axis direction) perpendicular to the upper surface of the second board 2310. String selection lines and ground selection lines may be disposed on the wordlines 2330. For example, the string selection lines and ground selection lines may be disposed above and below the wordlines 2330. A plurality of wordlines 2330 may be disposed between the string selection lines and the ground selection line. Similarly, the second cell region CELL2 may include a third board 2410 and a common source line (2420), and a plurality of wordlines 2431 to 2438 (2430) may be stacked in a direction (Z-axis direction) perpendicular to the upper surface of the third board 2410. The second board 2310 and the third board 2410 may be formed of various materials, for example, a board having a single crystal epitaxial layer grown on a silicon board, a silicon-a germanium board, a germanium board, or a monocrystalline silicon board. A plurality of channel structures CHs may be disposed in each of the first and second cell regions CELL1 and CELL2.

As illustrated in an example embodiment, in region A1, the channel structure CH may be provided in the bitline bonding region BLBA. The channel structure CH may extend in a direction perpendicular to the upper surface of the second board 2310 and may penetrate through the wordlines 2330, string selection lines, and ground selection lines. The channel structure CH may include a data storage layer, a channel layer, and a buried insulating layer. The channel layer may be electrically connected to the first metal wiring 2350$c$ and the second metal wiring 2360$c$ in a bitline bonding region BLBA. For example, the second metal wiring 2360$c$ may be a bitline and may be connected to the channel structure CH through the first metal wiring 2350$c$. The second metal wiring 2360$c$ (bitline) may extend in a first direction (Y-axis direction) parallel to the upper surface of the second board 2310.

In an example embodiment, as illustrated in region A2, the channel structure CH may include a lower channel LCH and an upper channel UCH connected to each other. The channel structure CH may be formed through a process for a lower channel LCH and a process for an upper channel UCH. The lower channel LCH may extend in a direction perpendicular to the upper surface of the second board 2310 and may penetrate through the common source line 2320 and the lower wordlines 2331 and 2332. The lower channel LCH may include a data storage layer, a channel layer and a buried insulating layer, and may be connected to an upper channel UCH. The upper channel UCH may penetrate through upper wordlines 2333-2338. The upper channel UCH may include a data storage layer, a channel layer and a buried insulating layer, and the channel layer of the upper channel UCH may be electrically connected to the first metal wiring 2350$c$ and the second metal wiring 2360$c$. As the length of the channel increases, it may be difficult to form a channel having a constant width. The nonvolatile memory device 2500 according to an example embodiment may include a channel having improved width uniformity through a lower channel LCH and an upper channel UCH formed through sequential processes.

As illustrated in region A2, when the channel structure CH is formed to include a lower channel LCH and an upper channel UCH, a wordline disposed adjacent to the boundary of the lower channel LCH and the upper channel UCH may be a dummy wordline. For example, the wordline 2332 and the wordline 2333 forming the boundary between the lower channel LCH and the upper channel UCH may be dummy wordlines. In this case, data may not be stored in the memory cells connected to the dummy wordline. Alternatively, the number of pages corresponding to memory cells connected to a dummy wordline may be less than the number of pages corresponding to memory cells connected to a general wordline. The voltage level applied to the dummy wordline may be different from the voltage level applied to the general wordline, and accordingly, the effect of the non-uniform channel width between the lower channel LCH and the upper channel UCH on the operation of the memory device may be reduced.

Referring to region A2, the number of lower wordlines 2331 and 2332 through which the lower channel LCH penetrates may be less than the number of upper wordlines 2333-2338 through which the upper channel UCH penetrates. However, this is merely an example, and an example embodiment thereof is not limited thereto. In another example embodiment, the number of lower wordlines penetrating through the lower channel LCH may be equal to or greater than the number of upper wordlines penetrating through the upper channel UCH. Also, the structure and connection relationship of the channel structure CH disposed in the first cell region CELL1 described herein may be applied to the channel structure CH disposed in the second cell region CELL2.

In the bitline bonding region BLBA, a first through-electrode THV1 may be provided in a first cell region CELL1, and a second through-electrode THV2 may be provided in a second cell region CELL2. As illustrated in FIG. 9, a first through-electrode THV1 may penetrate through a common source line 2320 and a plurality of wordlines 2330. However, this is merely an example, and the first through-electrode THV1 may further penetrate through the second board 2310. The first through-electrode THV1 may include a conductive material. The first through-electrode THV1 may include a conductive material surrounded by an insulating material. The second through-electrode THV2 may also be provided in the same form and structure as those of the first through-electrode THV1.

In an example embodiment, the first through-electrode THV1 and the second through-electrode THV2 may be electrically connected through a first through-metal pattern 2372$d$ and a second through-metal pattern 2472$d$. For example, the first through-electrode THV1 may be stacked on the second through-electrode THV2, and the first through-metal pattern 2372$d$ and the second through-metal pattern 2472$d$ may be stacked therebetween. The first through-metal pattern 2372$d$ may be disposed on the lower end portion of the first upper chip including the first cell region CELL1, and the second through-metal pattern 2472$d$ may be disposed on the upper end portion of the second upper chip including the second cell region CELL2. The first through-electrode THV1 may be electrically connected to the first metal wiring 2350$c$ and the second metal wiring 2360$c$. A lower via 2371$d$ may be disposed between the first through-electrode THV1 and the first through-metal pattern 2372$d$, and an upper via 2471$d$ may be disposed between the second through-electrode THV2 and the second through-metal pattern 2472$d$. The first through-metal pattern 2372$d$ and the second through-metal pattern 2472$d$ may be connected to each other by bonding.

Also, in the bitline bonding region BLBA, an upper metal pattern 2252 may be disposed on the uppermost metal layer of the peripheral circuit region PERI, and an upper metal pattern 2392 having the same shape as that of the upper metal pattern 2252 may be disposed in the uppermost metal layer of the first cell region CELL1. The upper metal pattern 2392 of the first cell region CELL1 and the upper metal pattern 2252 of the peripheral circuit region PERI may be electrically connected to each other by bonding. In the bitline bonding region BLBA, the second metal wiring 2360c (bitline) may be electrically connected to a page buffer included in the peripheral circuit region PERI. For example, a portion of the circuit devices 2220c of the peripheral circuit region PERI may provide a page buffer, and the second metal wiring 2360c (bitline) may be electrically connected to circuit devices 2220c providing a page buffer through the upper bonding metal 2370c of the first cell region CELL1 and the upper bonding metal 2270c of the peripheral circuit region PERI.

Referring to FIG. 17, in the wordline bonding region WLBA, the wordlines 2330 of the first cell region CELL1 may extend in a second direction (X-axis direction) parallel to the upper surface of the second board 2310 and may be connected to a plurality of cell contact plugs 340 (2341-2347). A first metal wiring 2350b and a second metal wiring 2360b may be connected in sequence to an upper portion of the cell contact plugs 2340, which may be connected to the wordlines 2330. The cell contact plugs 2340 may be connected to the peripheral circuit region PERI through the upper bonding metal 2370b of the first cell region CELL1 and the upper bonding metal 2270b of the peripheral circuit region PERI in the wordline bonding region WLBA.

The cell contact plugs 2340 may be electrically connected to a raw decoder disposed in a peripheral circuit region PERI. For example, a portion of the circuit devices 2220b of the peripheral circuit region PERI may provide a raw decoder, and the cell contact plugs 2340 may be electrically connected to the circuit devices 2220b providing the raw decoder through the upper bonding metal 2370b of the first cell region CELL1 and the upper bonding metal 2270b of the peripheral circuit region PERI. In an example embodiment, an operation voltage of the circuit devices 2220b providing a raw decoder may be different from an operation voltage of the circuit devices 2220c providing a page buffer. For example, an operation voltage of the circuit devices 2220c providing a page buffer may be greater than an operation voltage of the circuit devices 2220b providing a raw decoder.

Similarly, in the wordline bonding region WLBA, the wordlines 2430 of the second cell region CELL2 may extend in the second direction (X-axis direction) parallel to the upper surface of the third board 2410. The wordlines 2430 of the second cell region CELL2 may be connected to a plurality of cell contact plugs 2440 (2441-2447). The cell contact plugs 2440 may be connected to the peripheral circuit region PERI through an upper metal pattern of the second cell region CELL2, a lower metal pattern and an upper metal pattern of the first cell region CELL1, and a cell contact plug (2348).

In the wordline bonding region WLBA, an upper bonding metal 2370b may be disposed in a first cell region CELL1, and an upper bonding metal 2270b may be disposed in a peripheral circuit region PERI. The upper bonding metal 2370b of the first cell region CELL1 and the upper bonding metal 2270b of the peripheral circuit region PERI may be electrically connected to each other, for example, by bonding. The upper bonding metal 2370b and the upper bonding metal 2270b may be formed of aluminum, copper, or tungsten.

In the external pad bonding region PA, a lower metal pattern 2371e may be disposed in the lower portion of the first cell region CELL1, and an upper metal pattern (2472a) may be disposed in the upper portion of the second cell region CELL2. The lower metal pattern 2371e of the first cell region CELL1 and the upper metal pattern 2472a of the second cell region CELL2 may be connected to each other by bonding in the external pad bonding region PA. Similarly, an upper metal pattern 2372a may be disposed on the first cell region CELL1, and an upper metal pattern 2272a may be disposed on the peripheral circuit region PERI. The upper metal pattern 2372a of the first cell region CELL1 and the upper metal pattern 2272a of the peripheral circuit region PERI may be connected to each other, for example, by bonding.

Common source line contact plugs 2380 and 2480 may be disposed in the external pad bonding region PA. The common source line contact plugs 2380 and 2480 may be formed of a conductive material such as metal, metal compound, or doped polysilicon. The common source line contact plug 2380 of the first cell region CELL1 may be electrically connected to the common source line 2320, and the common source line contact plug 2480 of the second cell region CELL2 may be electrically connected to the common source line 2420. A first metal wiring 2350a and a second metal wiring (2360a) may be stacked in sequence on the common source line contact plug 2380 of the first cell region CELL1, and a first metal wiring 2450a and a second metal wiring 2460a may be stacked in sequence on the common source line contact plug 2480 of the second cell region CELL2.

The input/output pads 2205, 2405, and 2406 may be disposed in the external pad bonding region PA. Referring to FIG. 17, a lower insulating film 2201 may cover the lower surface of the first board 2210, and a first input/output pad 2205 may be disposed on the lower insulating film 2201. The first input/output pad 2205 may be connected to at least one of the plurality of circuit devices 2220a disposed in the peripheral circuit region PERI through the first input/output contact plug 2203 and may be isolated from the first board 2210 by a lower insulating film 2201. Also, a side insulating film may be disposed between the first input/output contact plug 2203 and the first board 2210 and may electrically isolate the first input/output contact plug 2203 and the first board 2210 from each other.

An upper insulating film 2401 covering an upper surface of the third board 2410 may be formed above the third board 2410. A second input/output pad 2405 or a third input/output pad 2406 may be disposed on the upper insulating film 2401. The second input/output pad 2405 may be connected to at least one of a plurality of circuit devices 2220a disposed in the peripheral circuit region PERI through the second input/output contact plugs 2403 and 2303, and the third input/output pad 2406 may be connected to at least one of the plurality of circuit devices 2220a arranged in the peripheral circuit region PERI through the third input/output contact plugs 2404 and 2304.

In an example embodiment, the third board 2410 may not be disposed in a region in which an input/output contact plug is disposed. For example, as illustrated in B, the third input/output contact plug 2404 may be isolated from the third board 2410 in a direction parallel to the upper surface of the third board 2410, and may penetrate through the interlayer insulating layer 2415 of the second cell region CELL2 and may be connected to the third input/output pad 2406. In this case, the third input/output contact plug 2404 may be formed through various processes.

For example, as illustrated in region B1, the third input/output contact plug 2404 may extend in the third direction (Z-axis direction) and may have a diameter increasing toward the upper insulating film 2401. That is, while the diameter of the channel structure CH described in region A1 is formed to decrease toward the upper insulating film 2401, the diameter of the third input/output contact plug 2404 may increase toward the upper insulating film 2401. For example, the third input/output contact plug 2404 may be formed after the second cell region CELL2 and the first cell region CELL1 are bonded to each other.

Also, as an example, as illustrated in region B2, the third input/output contact plug 2404 may extend in the third direction (Z-axis direction) and may have a diameter decreasing toward the upper insulating film 2401. That is, the diameter of the third input/output contact plug 2404 may decrease toward the upper insulating film 2401 similarly to the channel structure CH. For example, the third input/output contact plug 2404 may be formed together with the cell contact plugs 2440 before the second cell region CELL2 and the first cell region CELL1 are bonded to each other.

In another example embodiment, an input/output contact plug may be disposed to overlap the third board 2410. For example, as illustrated in region C, the second input/output contact plug 2403 may penetrate through the interlayer insulating layer 2415 of the second cell region CELL2 in the third direction (Z-axis direction), and may be electrically connected to the second input/output pad 2405 through the third board 2410. In this case, the connection structure of the second input/output contact plug 2403 and the second input/output pad 2405 may be implemented in various manners.

For example, as illustrated in region C1, an opening 2408 penetrating through the third board 2410 may be formed, and the second input/output contact plug 2403 may be directly connected to the second input/output pad 2405 through an opening 2408 disposed in the third board 2410. In this case, as illustrated in region C1, the diameter of the second input/output contact plug 2403 may increase toward the second input/output pad 2405. However, this is merely an example, and the diameter of the second input/output contact plug 2403 may decrease toward the second input/output pad 2405.

For example, as illustrated in region C2, an opening 2408 penetrating through the third board 2410 may be formed, and a contact 2407 may be disposed in the opening 2408. One end portion of the contact 2407 may be connected to the second input/output pad 2405, and the other end portion may be connected to the second input/output contact plug 2403. Accordingly, the second input/output contact plug 2403 may be electrically connected to the second input/output pad 2405 through the contact 2407 in the opening 2408. In this case, as illustrated in region C2, the diameter of the contact 2407 may increase toward the second input/output pad 2405, and the diameter of the second input/output contact plug 2403 may decrease toward the second input/output pad 2405. For example, the third input/output contact plug 2403 may be formed together with the cell contact plugs 2440 before the second cell region CELL2 and the first cell region CELL1 are bonded to each other, and the contact 2407 may be formed after the second cell region CELL2 and the first cell region CELL1 are bonded to each other.

Also, as an example, as illustrated in region C3, a stopper 2409 may be further disposed on the upper surface of the opening 2408 of the third board 2410. The stopper 2409 may be metal wiring disposed on the same layer as the common source line 2420. However, this is merely an example, and the stopper 2409 may be metal wiring disposed on the same layer as at least one of the wordlines 2430. The second input/output contact plug 2403 may be electrically connected to the second input/output pad 2405 through the contact 2407 and the stopper 2409.

Similarly to the second and third input/output contact plugs 2403 and 2404 of the second cell region CELL2, the second and third input/output contact plugs 2303 and 2304 of the first cell region CELL1 may have a diameter decreasing toward the lower metal pattern 2371e or a diameter increasing toward the lower metal pattern 2371e, respectively.

In example embodiments, a slit 411 may be disposed on the third board 2410. For example, the slit 2411 may be disposed in an arbitrary position of the external pad bonding region PA. In an example embodiment, as illustrated D, the slit 2411 may be disposed between the second input/output pad 2405 and the cell contact plugs 2440 when viewed from a plane. However, this is merely an example, and the slit 2411 may be formed such that the second input/output pad 2405 may be disposed between the slit 2411 and the cell contact plugs 2440 when viewed from a plane.

For example, as illustrated in region D1, the slit 2411 may be formed to penetrate through the third board 2410. The slit 2411 may be used to prevent the third board 2410 from being finely split when the opening 2408 is formed. However, this is merely an example, and the slit 2411 may be formed to a depth of about 60-70% of the thickness of the third board 2410.

Also, as an example, as illustrated in region D2, a conductive material 2412 may be disposed in the slit 2411. The conductive material 2412 may be used, for example, to discharge leakage current generated during driving of circuit devices in an external pad bonding region PA. In this case, the conductive material 2412 may be connected to an external ground line.

As an example, as illustrated in region D3, an insulating material 2413 may be disposed in the slit 2411. The insulating material 2413 may electrically isolate the second input/output pad 2405 and the second input/output contact plug 2403 disposed in the external pad bonding region PA from the wordline bonding region WLBA, for example. By forming the insulating material 2413 in the slit 2411, the voltage provided through the second input/output pad 2405 may be prevented from affecting the metal layer disposed on the third board 2410 in the wordline bonding region WLBA.

In example embodiments, first to third input/output pads 2205, 2405, and 2406 may be selectively formed. For example, the nonvolatile memory device 2500 may include the first input/output pad 2205 disposed on the first board 2210, may include the second input/output pad 2405 disposed on the third board 2410, or may include the third input/output pad 2406 disposed on the upper insulating film 2401.

In example embodiments, at least one of the second board 2310 of the first cell region CELL1 and the third board 2410 of the second cell region CELL2 may be used as a sacrificial board, and may be completely or partially removed before or after the bonding process. An additional film may be deposited after removing the board. For example, the second board 2310 of the first cell region CELL1 may be removed before or after bonding between the peripheral circuit region PERI and the first cell region CELL1, and an insulating film covering the upper surface of the common source line 2320 or a conductive film for connection may be formed. Similarly, the third board 2410 of the second cell region CELL2 may be removed before or after bonding between the first cell region CELL1 and the second cell region CELL2, and an upper insulating film 2401 covering the upper surface of the common source line 2420 or a conductive film for connection may be formed.

The device described herein may be implemented with hardware components, software components, and/or a combination of hardware components and software components. For example, the device and components described in an example embodiment may be implemented using one or more general-purpose or special-purpose computers such as a processor, a controller, an arithmetic logic unit (ALU), a digital signal processor, a microcomputer, a field programmable gate array (FPGA), and a programmable logic unit (PLU), a microprocessor, or any other device which may execute instructions and respond. A processing device may execute an operating system (OS) and one or more software applications running on the operating system. Also, a processing device may access, store, manipulate, process and generate data in response to the execution of software. For ease of description, a single processing device may be used, but the processing device may include a plurality of processing elements or a plurality of types of processing elements. For example, a processing device may include a plurality of processors or a processor and a controller. Also, other processing configurations, such as parallel processors, may be possible.

Software may include a computer program, codes, instructions, or a combination of one or more thereof, and may configure the processing device to operate as desired or to instruct the processing device independently or collectively. Software and/or data may be embodied in any type of machine, component, physical device, virtual equipment, computer storage medium or device to be interpreted by or to provide instructions or data to a processing device. Software may be distributed over networked computer systems and may be stored or executed in a distributed manner. Software and data may be stored on one or more computer-readable recording media.

In an example embodiment, the Vref information of the WL detector may be loaded during a mass production process, and a comparator-counter-comparator circuit maybe installed in the WL detector circuit. When the Vref level of the defense code is different for each chip, the detection time (test time) of the defense code is not constant, and the detection time may be applied when information on the counter clock number of the WL detector is installed during the mass production process.

According to example embodiments, the nonvolatile memory device including a wordline leakage current detector, the storage device including the same, and the method of operating the same may improve accuracy of detecting wordline leakage by reflecting the leakage component of the peripheral region.

While example embodiments have been illustrated and described herein, it will be configured as apparent to those skilled in the art that modifications and variations could be made without departing from the scope of the present disclosure as defined by the appended claims.

What is claimed is:

1. A nonvolatile memory device, comprising:
a memory cell array including a plurality of memory cells connected to a plurality of wordlines and a plurality of bitlines;
a row decoder configured to select one of the plurality of wordlines in response to an address; and
a wordline leakage current detector configured to determine whether the selected wordline is defective using trim information related to a level of a reference voltage or a gradient of a detect voltage during a test operation,
wherein the trim information is stored internally in an electrical die sorting (EDS) process.

2. The nonvolatile memory device of claim 1, wherein the memory cell array and the row decoder include a core chip and a peripheral chip disposed below the core chip, and wherein the peripheral chip includes the wordline leakage current detector.

3. The nonvolatile memory device of claim 1, wherein first trim information related to a level of the reference voltage is extracted from the EDS process and stored in an E-fuse for each chip.

4. The nonvolatile memory device of claim 3, wherein the first trim information is determined by starting a detecting operation of the wordline leakage current detector from a level corresponding to a default value in the EDS process, and repeating the detecting operation while lowering a level by a predetermined level until the detecting operation passes.

5. The nonvolatile memory device of claim 3, wherein the wordline leakage current detector compares a detected voltage of the selected wordline with a reference voltage corresponding to the first trim information in the test operation, and outputs a good product signal corresponding to a result of the comparison.

6. The nonvolatile memory device of claim 3, wherein the wordline leakage current detector includes:
a first capacitor connected between a first node and a second node providing a test voltage to the selected wordline during the test operation;
a second capacitor connected between the second node and a ground terminal;
a comparator configured to compare the detected voltage with a reference voltage of the second node and to output a good product signal corresponding to a result of the comparison; and
a reference voltage generator configured to generate the reference voltage using the first trim information.

7. The nonvolatile memory device of claim 1, wherein second trim information related to a gradient of the detected voltage is extracted from the EDS process and stored in an E-fuse for each chip.

8. The nonvolatile memory device of claim 7, wherein the second trim information corresponds to a difference between a first count value at which the detected voltage reaches a first level and a second count value at which the detected voltage reaches a second level in the EDS process.

9. The nonvolatile memory device of claim 7, wherein the wordline leakage current detector includes:
a first comparator configured to compare a corresponding detected voltage with a first reference voltage and to output a first output voltage when applying a test voltage to the selected wordline in the test operation;
a second comparator configured to compare the detected voltage with a second reference voltage different from the first reference voltage and to output a second output voltage;
a first counter configured to output a first count value by counting until the first output voltage reaches a first level;
a second counter configured to output a second count value by counting until the second output voltage reaches a second level different from the first level;
a first register configured to store the first count value;
a second register configured to store the second count value;
a calculation unit configured to calculate a difference value between the first count value and the second count value; and
a verification comparator configured to compare the difference value with a count value corresponding to the second trim information and to output a good product signal corresponding to a result of the comparison.

10. The nonvolatile memory device of claim 9, wherein the wordline leakage current detector further includes a fuse trim set configured to output the second reference voltage by trimming the first reference voltage.

11. A method of operating a nonvolatile memory device including a core chip having memory blocks connected to wordlines and bitlines and a peripheral chip disposed below the core chip and having a wordline leakage current detector, the method comprising:
    extracting trim information related to a level of a reference voltage of the wordline leakage current detector or a gradient of detected voltage of the wordline leakage current detector for each chip in an electrical die sorting (EDS) process; and
    testing leakage of a target wordline among the wordlines in a test operation using the trim information.

12. The method of claim 11, wherein the extracting the trim information includes:
    determining whether a detecting operation of the wordline leakage current detector passes at a reference level corresponding to a default value;
    determining whether a detecting operation of the wordline leakage current detector passes while lowering the reference level to a predetermined level.

13. The method of claim 11, wherein the extracting trim information includes:
    outputting a first count value until the detected voltage reaches a first reference voltage;
    outputting a second count value until the detected voltage reaches a second reference voltage different from the first reference voltage; and
    storing the trim information corresponding to a difference value between the second count value and the first count value.

14. The method of claim 13, wherein the testing leakage of a target wordline includes:
    calculating a difference value between a count value at which the detected voltage reaches the first reference voltage and a count value at which the detected voltage reaches the second reference voltage in the test operation; and
    outputting a good product signal configured to determine leakage of the target wordline by comparing the calculated difference value with a count value corresponding to the trim information.

15. The method of claim 11, wherein the wordline leakage current detector is shared by at least two planes.

16. A storage device, comprising:
    at least one nonvolatile memory device; and
    a controller configured to control the at least one nonvolatile memory device,
    wherein the at least one nonvolatile memory device includes:
    a memory cell array including a plurality of memory cells connected to a plurality of wordlines and a plurality of bitlines; and
    a wordline leakage current detector configured to determine whether the selected wordline among the plurality of wordlines is defective using trim information related to a level of a reference voltage or a gradient of detected voltage during a test operation.

17. The storage device of claim 16, wherein the trim information is extracted for each chip in an electrical die sorting (EDS) process and stored in the at least one nonvolatile memory device.

18. The storage device of claim 16, wherein the test operation is performed according to a request from the controller or an internal policy.

19. The storage device of claim 16, wherein the wordline leakage current detector compares a detected voltage of the selected wordline with a reference voltage corresponding to the trim information in the test operation, and outputs a good product signal corresponding to a result of the comparison.

20. The storage device of claim 16, wherein the wordline leakage current detector calculates a difference value between a first count value at which the detected voltage reaches a first level and a second count value at which the detected voltage reaches a second level different from the first level in the test operation, compares a difference value with a count value corresponding to the trim information, and outputs a good product signal corresponding to a result of the comparison.

* * * * *